United States Patent
Fujita et al.

(10) Patent No.: US 9,709,387 B2
(45) Date of Patent: Jul. 18, 2017

(54) IMAGE GENERATION DEVICE FOR ACQUIRING DISTANCES OF OBJECTS PRESENT IN IMAGE SPACE

(71) Applicant: MITSUBISHI ELECTRIC CORPORATION, Tokyo (JP)

(72) Inventors: Takeo Fujita, Tokyo (JP); Koichi Yamashita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 247 days.

(21) Appl. No.: 14/424,391

(22) PCT Filed: Nov. 20, 2013

(86) PCT No.: PCT/JP2013/081272
§ 371 (c)(1),
(2) Date: Feb. 26, 2015

(87) PCT Pub. No.: WO2014/080937
PCT Pub. Date: May 30, 2014

(65) Prior Publication Data
US 2015/0204657 A1  Jul. 23, 2015

(30) Foreign Application Priority Data

Nov. 21, 2012  (JP) .................................. 2012-255427
Nov. 21, 2012  (JP) .................................. 2012-255482

(51) Int. Cl.
G01B 11/14 (2006.01)
G06T 7/00 (2017.01)
(Continued)

(52) U.S. Cl.
CPC .......... *G01B 11/14* (2013.01); *G01B 11/2513* (2013.01); *G01C 3/08* (2013.01);
(Continued)

(58) Field of Classification Search
CPC ...... G01B 11/14; G01B 11/2513; G01C 3/08; G01C 3/32; G06K 9/00805;
(Continued)

(56) References Cited

U.S. PATENT DOCUMENTS 4,834,530 A    5/1989  Murai et al.
9,448,064 B2 * 9/2016  Atanassov .............. G06T 5/001
(Continued)

FOREIGN PATENT DOCUMENTS

CN    101044750 A    9/2007
CN    10238974 A    8/2008
(Continued)

*Primary Examiner* — Francis G Geroleo
(74) *Attorney, Agent, or Firm* — Birch, Stewart, Kolasch & Birch, LLP

(57) ABSTRACT

An imaging signal obtained during pattern light projection and an imaging signal during pattern light non-projection are separated from an imaging signal, and the projection angle of a light spot is specified on the basis of an array of light spots in the projection image component. The projected pattern light includes a plurality of cells that accompanies the light spots and that constitutes a discrimination code, and specifies the position of the light spots accompanied by the discrimination code in the projection pattern on the basis of the discrimination code. Distance information to an object to be imaged can be acquired using a low amount of computation.

19 Claims, 16 Drawing Sheets

(51) Int. Cl.
    *G06K 9/00*     (2006.01)
    *G01C 3/08*     (2006.01)
    *H04N 7/18*     (2006.01)
    *G01B 11/25*     (2006.01)
    *G01C 3/32*     (2006.01)
    *G06T 7/521*     (2017.01)

(52) U.S. Cl.
    CPC ........... *G01C 3/32* (2013.01); *G06K 9/00805* (2013.01); *G06T 7/521* (2017.01); *H04N 7/183* (2013.01); *G06T 2207/10004* (2013.01); *G06T 2207/30252* (2013.01); *G06T 2207/30261* (2013.01)

(58) Field of Classification Search
    CPC . G06T 2207/10004; G06T 2207/30252; G06T 2207/30261; G06T 7/0042; G06T 7/0057; H04N 7/183
    USPC .......................................................... 348/136
    See application file for complete search history.

(56) References Cited

U.S. PATENT DOCUMENTS

| | | |
|---|---|---|
| 2007/0008597 A1 | 1/2007 | Watanabe et al. |
| 2007/0091174 A1* | 4/2007 | Kochi ................ G01B 11/2509 348/135 |
| 2007/0146539 A1 | 6/2007 | Kawahara et al. |
| 2007/0216894 A1 | 9/2007 | Garcia et al. |
| 2008/0044060 A1 | 2/2008 | Satoh et al. |
| 2008/0251694 A1 | 10/2008 | Tanimoto et al. |
| 2009/0033773 A1 | 2/2009 | Kinoshita et al. |
| 2011/0304701 A1 | 12/2011 | Ito |
| 2012/0050713 A1 | 3/2012 | Inoue |
| 2013/0038882 A1 | 2/2013 | Umeda et al. |

FOREIGN PATENT DOCUMENTS

| | | |
|---|---|---|
| CN | 102281455 A | 12/2011 |
| JP | 63-24116 A | 2/1988 |
| JP | 4-24590 A | 1/1992 |
| JP | 6-87377 A | 3/1994 |
| JP | 2000-111490 A | 4/2000 |
| JP | 2001-119722 A | 4/2001 |
| JP | 2004-191092 A | 7/2004 |
| JP | 2005-331476 A | 12/2005 |
| JP | 2007-17643 A | 1/2007 |
| JP | 2007-93306 A | 4/2007 |
| JP | 2007-256090 A | 10/2007 |
| JP | 4043931 B2 | 2/2008 |
| JP | 2008-67362 A | 3/2008 |
| JP | 2008-188196 A | 8/2008 |
| JP | 2009-528514 A | 8/2009 |
| JP | 2010-101683 A | 5/2010 |
| JP | 2011-169701 A | 9/2011 |
| JP | 2012-47500 A | 3/2012 |
| JP | 4917615 B2 | 4/2012 |

* cited by examiner

FIG. 5
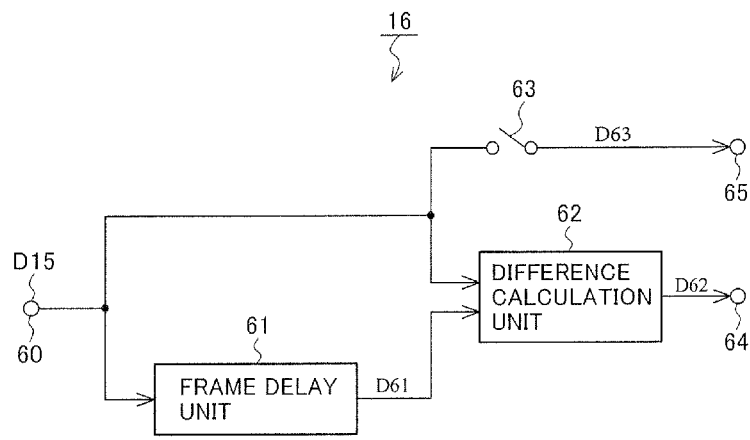
FIG. 6(a)
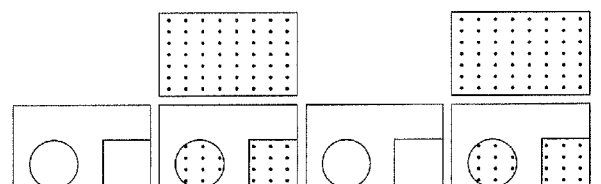
FIG. 6(b)
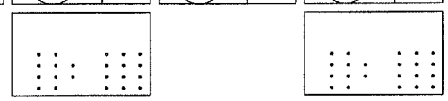
FIG. 6(c)
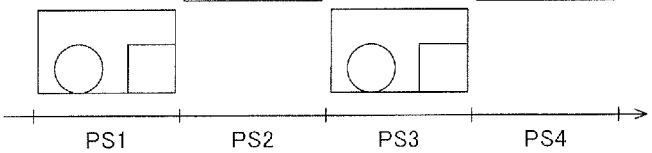
FIG. 6(d)
FIG. 7
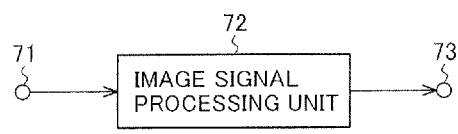

FIG. 9

| No. | c1 | c2 | c3 | c4 | c5 | c6 | c7 | c8 | No. | c1 | c2 | c3 | c4 | c5 | c6 | c7 | c8 |
|---|---|---|---|---|---|---|---|---|---|---|---|---|---|---|---|---|---|
| 0 | 0 | 1 | 1 | 0 | 0 | 0 | 0 | 0 | 28 | 0 | 1 | 1 | 0 | 0 | 1 | 1 | 0 |
| 1 | 0 | 0 | 1 | 0 | 0 | 0 | 0 | 0 | 29 | 0 | 0 | 1 | 0 | 0 | 1 | 1 | 0 |
| 2 | 1 | 0 | 1 | 0 | 0 | 0 | 0 | 0 | 30 | 1 | 0 | 1 | 0 | 0 | 1 | 1 | 0 |
| 3 | 1 | 0 | 0 | 0 | 0 | 0 | 0 | 0 | 31 | 1 | 0 | 0 | 0 | 0 | 1 | 1 | 0 |
| 4 | 1 | 0 | 0 | 0 | 0 | 0 | 0 | 1 | 32 | 1 | 0 | 0 | 0 | 0 | 0 | 1 | 0 |
| 5 | 1 | 0 | 1 | 0 | 0 | 0 | 0 | 1 | 33 | 1 | 0 | 1 | 0 | 0 | 0 | 1 | 0 |
| 6 | 0 | 0 | 1 | 0 | 0 | 0 | 0 | 1 | 34 | 0 | 0 | 1 | 0 | 0 | 0 | 1 | 0 |
| 7 | 0 | 1 | 1 | 0 | 0 | 0 | 0 | 1 | 35 | 0 | 1 | 1 | 0 | 0 | 0 | 1 | 0 |
| 8 | 0 | 1 | 0 | 0 | 0 | 0 | 0 | 1 | 36 | 0 | 1 | 0 | 0 | 0 | 0 | 1 | 0 |
| 9 | 0 | 1 | 0 | 1 | 0 | 0 | 0 | 1 | 37 | 0 | 1 | 0 | 1 | 0 | 0 | 1 | 0 |
| 10 | 0 | 0 | 0 | 1 | 0 | 0 | 0 | 1 | 38 | 0 | 0 | 0 | 1 | 0 | 0 | 1 | 0 |
| 11 | 0 | 0 | 0 | 1 | 0 | 1 | 0 | 1 | 39 | 0 | 0 | 0 | 1 | 1 | 0 | 1 | 0 |
| 12 | 0 | 1 | 0 | 1 | 0 | 1 | 0 | 1 | 40 | 0 | 1 | 0 | 1 | 1 | 0 | 1 | 0 |
| 13 | 0 | 1 | 0 | 0 | 0 | 1 | 0 | 1 | 41 | 0 | 1 | 0 | 0 | 1 | 0 | 1 | 0 |
| 14 | 0 | 1 | 1 | 0 | 0 | 1 | 0 | 1 | 42 | 0 | 1 | 1 | 0 | 1 | 0 | 1 | 0 |
| 15 | 0 | 0 | 1 | 0 | 0 | 1 | 0 | 1 | 43 | 0 | 0 | 1 | 0 | 1 | 0 | 1 | 0 |
| 16 | 1 | 0 | 1 | 0 | 0 | 1 | 0 | 1 | 44 | 1 | 0 | 1 | 0 | 1 | 0 | 1 | 0 |
| 17 | 1 | 0 | 0 | 0 | 0 | 1 | 0 | 1 | 45 | 1 | 0 | 0 | 0 | 1 | 0 | 1 | 0 |
| 18 | 1 | 0 | 0 | 0 | 0 | 1 | 0 | 0 | 46 | 1 | 0 | 0 | 0 | 1 | 0 | 0 | 0 |
| 19 | 1 | 0 | 1 | 0 | 0 | 1 | 0 | 0 | 47 | 1 | 0 | 1 | 0 | 1 | 0 | 0 | 0 |
| 20 | 0 | 0 | 1 | 0 | 0 | 1 | 0 | 0 | 48 | 0 | 0 | 1 | 0 | 1 | 0 | 0 | 0 |
| 21 | 0 | 1 | 1 | 0 | 0 | 1 | 0 | 0 | 49 | 0 | 1 | 1 | 0 | 1 | 0 | 0 | 0 |
| 22 | 0 | 1 | 0 | 0 | 0 | 1 | 0 | 0 | 50 | 0 | 1 | 0 | 0 | 1 | 0 | 0 | 0 |
| 23 | 0 | 1 | 0 | 1 | 0 | 1 | 0 | 0 | 51 | 0 | 1 | 0 | 1 | 1 | 0 | 0 | 0 |
| 24 | 0 | 0 | 0 | 1 | 0 | 1 | 0 | 0 | 52 | 0 | 0 | 0 | 1 | 1 | 0 | 0 | 0 |
| 25 | 0 | 0 | 0 | 1 | 0 | 1 | 1 | 0 | 53 | 0 | 0 | 0 | 1 | 0 | 0 | 0 | 0 |
| 26 | 0 | 1 | 0 | 1 | 0 | 1 | 1 | 0 | 54 | 0 | 1 | 0 | 1 | 0 | 0 | 0 | 0 |
| 27 | 0 | 1 | 0 | 0 | 0 | 1 | 1 | 0 | 55 | 0 | 1 | 0 | 0 | 0 | 0 | 0 | 0 |

FIG. 14(a)     FIG. 14(b)
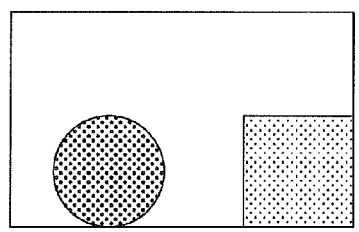
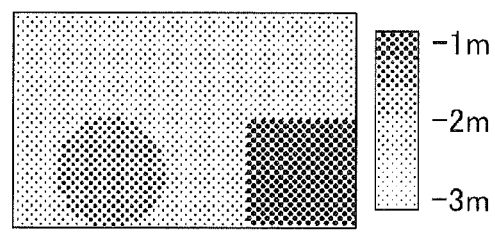
FIG. 15
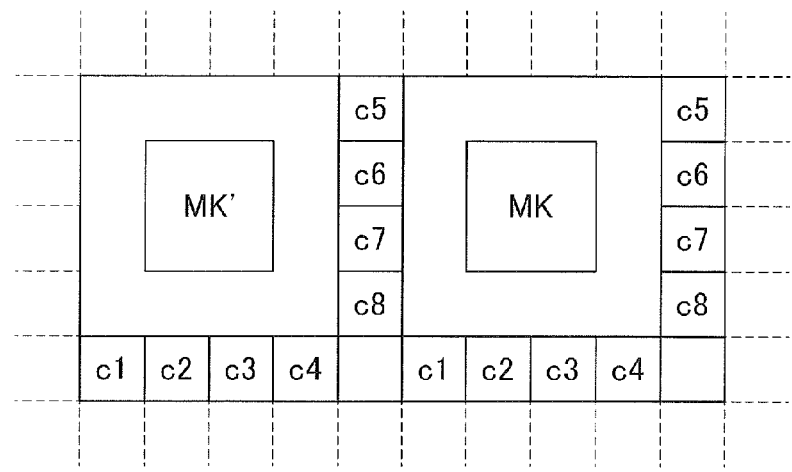

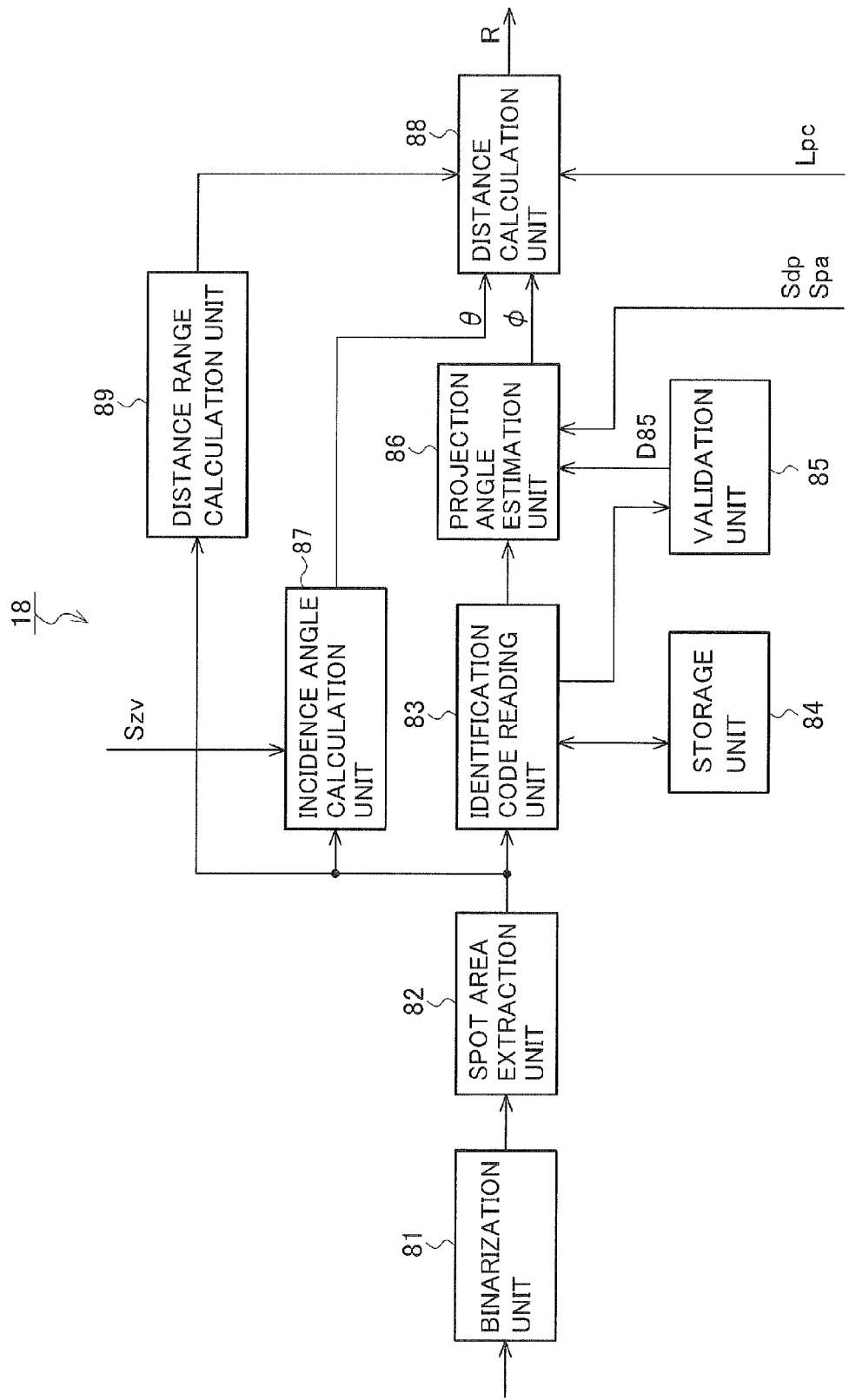

FIG. 22(a)

| GB11 | BB21 | GB31 | BB41 | GB51 | BB61 |
|---|---|---|---|---|---|
| *RR12* | GR22 | *RR32* | GR42 | *RR52* | GR62 |
| GB13 | BB23 | GB33 | BB43 | GB53 | BB63 |
| *RR14* | GR24 | *RR34* | GR44 | *RR54* | GR64 |
| GB15 | BB25 | GB35 | BB45 | GB55 | BB65 |
| *RR16* | GR26 | *RR36* | GR46 | *RR56* | GR66 |

FIG. 22(b)

| GB11 | BB21 | *GB31* | BB41 | GB51 | BB61 |
|---|---|---|---|---|---|
| RR12 | *GR22* | RR32 | *GR42* | RR52 | GR62 |
| *GB13* | BB23 | *GB33* | BB43 | *GB53* | BB63 |
| RR14 | *GR24* | RR34 | *GR44* | RR54 | GR64 |
| GB15 | BB25 | *GB35* | BB45 | GB55 | BB65 |
| RR16 | GR26 | RR36 | GR46 | RR56 | GR66 |

FIG. 22(c)

| GB11 | *BB21* | GB31 | *BB41* | GB51 | *BB61* |
|---|---|---|---|---|---|
| RR12 | GR22 | RR32 | GR42 | RR52 | GR62 |
| GB13 | *BB23* | GB33 | *BB43* | GB53 | *BB63* |
| RR14 | GR24 | RR34 | GR44 | RR54 | GR64 |
| GB15 | *BB25* | GB35 | *BB45* | GB55 | *BB65* |
| RR16 | GR26 | RR36 | GR46 | RR56 | GR66 |

IMAGE GENERATION DEVICE FOR ACQUIRING DISTANCES OF OBJECTS PRESENT IN IMAGE SPACE

TECHNICAL FIELD

The present invention relates to an image generation device that can acquire, in association with a captured image, information about distances to objects present in the imaged space.

BACKGROUND ART

As a conventional vehicle peripheral monitoring device, there is a known device in which, when an illumination detection means detects illuminance above a predetermined level, a display device displays the state of a monitored area imaged by an imaging means, and when the illuminance is below the predetermined level, the display device displays obstacle information acquired by illumination with pattern light, imaging of the reflected light, and data processing (see, for example, patent reference 1).

A system that performs optical distance measurement by use of speckle patterns is also known. This system projects a primary speckle pattern from an illumination assembly into a target area, captures a plurality of reference images of the primary speckle pattern at different distances in the target area from the illumination assembly, captures a test image of the primary speckle pattern projected onto the surface of an object in the target area, compares the test image with the reference images to identify the reference image in which the primary speckle pattern most closely matches the primary speckle pattern in the test image, and estimates the position of the object on the basis of the distance of the identified reference image from the illumination assembly (for example, patent reference 2).

PRIOR ART REFERENCES

Patent References

Patent reference 1: Japanese Patent Application Publication No. H6-87377 (page 2, claim 1)
Patent reference 2: Japanese Patent Application Publication (translation of PCT application) No. 2009-528514 (paragraphs 0001, 0006, and 0007)
Patent reference 3: Japanese Patent Application Publication No. 2007-17643 (paragraphs 0003 and 0004)

SUMMARY OF THE INVENTION

Problems to be Solved by the Invention

A problem in the above conventional vehicle peripheral monitoring device has been that since its operation must be switched according to the illuminance, only one type of information can be obtained, either a captured image or distance information.

A problem in the above conventional optical distance measurement system has been the need to perform correlation calculations for pattern matching between the imaged pattern and a plurality of reference patterns, requiring a large amount of computation.

The present invention addresses these problems, and its object is to enable enabling both a captured image and distance information to be acquired, even in a bright illuminance environment, and to make it possible to determine the position, in the projected pattern, of each spot in the captured image and to generate an image with distance information, with a small amount of computation.

Means for Solving the Problem

An image generation device according to a first aspect of the invention comprises:

a projection unit for projecting pattern light of a prescribed wavelength into an imaged space;

an imaging unit for imaging the imaged space;

a separation unit for separating a projected pattern image component from an imaging signal obtained by imaging by the imaging unit by taking a difference between the imaging signal obtained when the pattern light is projected and the imaging signal obtained when the pattern light is not projected; and a distance information generation unit for generating distance information on a basis of a projected image component separated by the separation unit; wherein the distance information generation unit determines projection angles of light spots in the imaged projected pattern from an arrangement of the light spots in the projected image represented by the projected image component and a pre-stored relationship between the projection angles and positions of the light spots in the projected pattern, and determines a distance to a surface of an imaged object onto which the light spots are projected on a basis of the projection angles thus determined;

the pattern light projected from the projection unit includes a plurality of cells, each in an on state or an off state, forming an identification code accompanying each light spot;

the distance information generation unit determines the positions of the light spots accompanied by the identification codes in the projected pattern on a basis of the identification codes;

the identification code accompanying each light spot has a first part comprising a plurality of cells, aligned in a first direction in the projected pattern, and disposed on one side of the light spot in a second direction in the projected pattern, and a second part comprising a plurality of cells, aligned in the second direction, and disposed on one side of the light spot in the first direction;

the identification codes accompanying the light spots that are adjacent in the first direction have at most one location at which the cells constituting the second parts of the identification codes change from the on state to the off state or from the off state to the on state; and the first parts of the identification codes accompanying the light spots that are adjacent in the second direction are mutually identical.

An image generation device according to a second aspect of the invention comprises:

a projection unit for projecting pattern light of a prescribed wavelength into an imaged space;

an imaging unit for imaging the imaged space;

a separation unit for separating a projected pattern image component from an imaging signal obtained by imaging by the imaging unit by taking a difference between the imaging signal obtained when the pattern light is projected and the imaging signal obtained when the pattern light is not projected; and a distance information generation unit for generating distance information on a basis of a projected image component separated by the separation unit; wherein the distance information generation unit determines projection angles of light spots in the imaged projected pattern from an arrangement of the light spots in the projected image represented by the projected image component and a pre-stored relationship between the projection angles and positions of the light spots in the projected pattern, and determines a distance to a surface of an imaged object onto which the light spots are projected on a basis of the projection angles thus determined;

the pattern light projected from the projection unit includes a plurality of cells, each in an on state or an off state, forming an identification code accompanying each light spot;

the distance information generation unit determines the positions of the light spots accompanied by the identification codes in the projected pattern on a basis of the identification codes; and the identification codes are determined in such a manner that there is only one location at which the cells constituting the identification codes change from the on state to the off state or from the off state to the on state between the light spots that are adjacent in a first direction in the projected pattern.

Effects of the Invention

According to the present invention, both a captured image and distance information can be acquired, even in a bright illuminance environment, and the distance information associated with the image can be obtained.

In addition, the position, in the projected pattern, of each spot in the captured image can be determined, and information about distances to imaged objects can be acquired with a small amount of computation.

BRIEF DESCRIPTION OF THE DRAWINGS

FIG. 5 is a block diagram showing an example of the configuration of a separation unit 16 in FIG. 1.

FIGS. 6(a) to 6(d) are diagrams that illustrate the operation of the separation unit 16 in FIG. 5.

FIG. 7 is a block diagram showing an example of the configuration of an image generation unit in FIG. 1.

FIG. 9 is a table showing an example of identification codes used in the projected pattern.

FIGS. 14(a) and 14(b) show exemplary images output by a display processing unit in FIG. 1.

FIG. 15 is a diagram that illustrates identification codes accompanying adjacent spot areas.

FIG. 16 is a block diagram showing an example of the configuration of a distance information generation unit used in a second embodiment of the invention.

FIGS. 22(a) to 22(c) are diagrams that illustrate the disposition of pixels summed by a pixel summation unit 74 in FIG. 21.

MODE FOR CARRYING OUT THE INVENTION

First Embodiment

Figure 1:
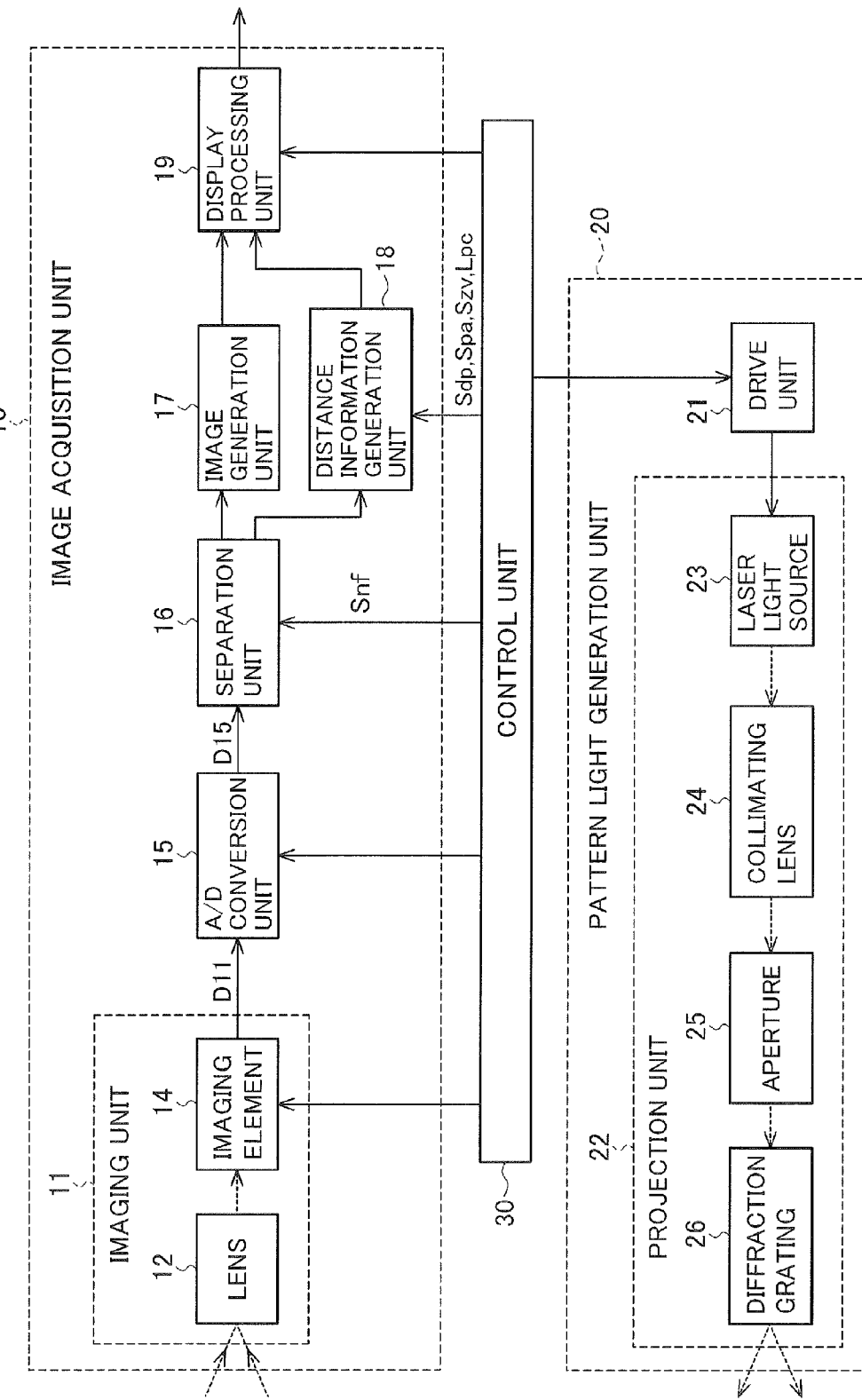
FIG. 1 is a block diagram showing an image generation device in a first embodiment of the present invention.

FIG. 1 is a block diagram showing the configuration of an image generation device in a first embodiment of the invention. The illustrated image generation device includes an image acquisition unit 10, a pattern light generation unit 20, and a control unit 30.

The image acquisition unit 10 includes an imaging unit 11. The pattern light generation unit 20 includes a projection unit 22.

Figure 2:
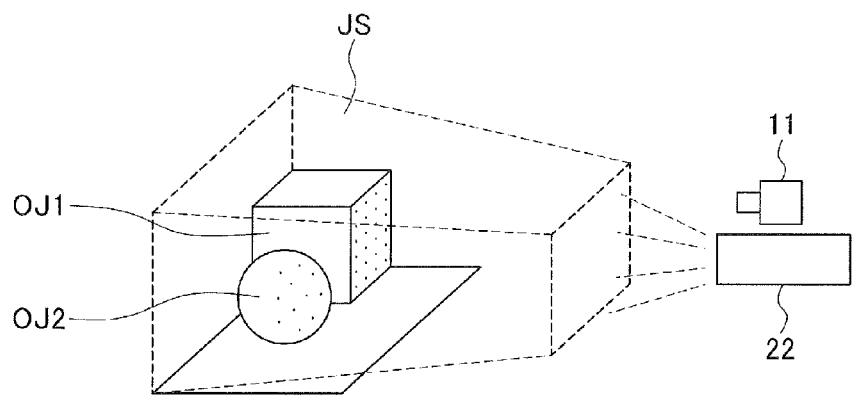
FIG. 2 is a diagram that three-dimensionally illustrates the disposition of an imaging unit 11 and a projection unit 22 in FIG. 1.

FIG. 2 three-dimensionally represents an imaged space (a space which is imaged) JS together with the projection unit 22 and the imaging unit 11. In FIG. 2, a rectangular parallelepiped object OJ1 and a spherical object OJ2 are supposed to be present in the imaged space JS.

The imaging unit 11 receives light from the objects OJ1, OJ2 in the imaged space JS as shown in FIG. 2 and performs imaging.

From information acquired by imaging, the image generation device in the invention determines the distances to different parts of the objects OJ1, OJ2, and obtains image information and information about the distances to the different parts of the image.

As shown in FIG. 2, the projection unit 22 projects pattern light into the imaged space JS, creating a projected pattern. In the example shown in FIG. 2, the projected pattern consists of light spots arranged in a matrix form, aligned in the lateral direction (the row direction) and the vertical direction (the column direction). Unless otherwise specifically noted, the term 'direction', when used herein in relation to the projected pattern, means a direction in the projected pattern formed when the pattern light is projected onto a virtual plane perpendicular to the optical axis. This also applies when the following description refers to an 'arrangement' or 'position' in the projected pattern.

Figure 3:
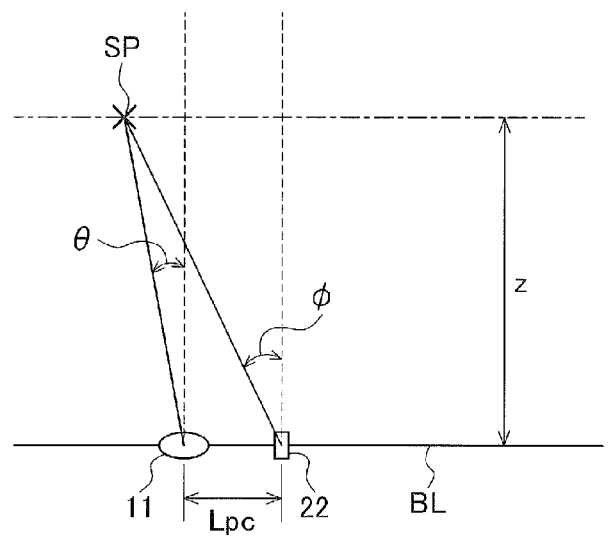
FIG. 3 is a diagram that illustrates the disposition of the imaging unit and the projection unit in the first embodiment of the invention.

FIG. 3 is a top view of the imaging unit 11, the projection unit 22, and a light spot SP formed at an arbitrary point on one of the objects OJ1, OJ2 in the imaged space. The imaging unit 11 and the projection unit 22 are spaced apart from each other by a distance Lpc in the horizontal direction. That is, the imaging unit 11 and the projection unit 22 are disposed at different positions in the horizontal direction, but at the same position in the vertical direction (up and down direction). The line linking the imaging unit 11 and the projection unit 22 is called a base line BL and the distance Lpc is called a base line length.

The lateral direction in the projected pattern corresponds to the direction of the base line BL, that is, the horizontal direction, and the vertical direction corresponds to the direction orthogonal to the horizontal direction.

Suppose that light projected from the projection unit 22 forms a light spot SP on one of the objects OJ1, OJ2 in the imaged space JS, and light from the light spot SP is received by the imaging unit 11. In this case, if the projection angle $\phi$ from the projection unit 22 to the light spot SP, the incidence angle $\theta$ from the light spot SP to the imaging unit 11, and the base line length Lpc are known, the distance Z from the base line BL to the light spot on the object OJ1 or OJ2 can be determined by a calculation based on the principle of triangulation.

Here, the projection angle $\phi$ is, as shown in FIG. 3, the angle between a line perpendicular to the base line BL and a line linking the projection unit 22 and the light spot SP in the plane including the base line BL and the light spot SP.

The incidence angle $\theta$ is, as shown in FIG. 3, the angle between the line perpendicular to the base line BL and a line linking the imaging unit 11 and the light spot SP in the plane including the base line BL and the light spot SP.

The incidence angle $\theta$ at the imaging unit 11 can be determined from the position, in the imaging plane of the imaging unit 11, at which the image of the light spot is formed, the direction of the axis line of an imaging element, and the view angle.

The projection angle $\phi$ from the projection unit 22 depends on the configuration of the projection unit 22, and is accordingly known in advance.

When multiple light spots are projected from the projection unit 22 at varying projection angles and these light spots are imaged by the imaging unit 11, if the projection angles of the individual light spots are known, the projection angle of each light spot on the imaging plane can be estimated from the relationship among the positions of the light spots in the image.

In this case, if a condition (a) 'the magnitude relationship of the projection angles of the individual light spots in the projection unit 22 (their order when arranged from smaller to larger, for example) is the same as the magnitude relationship of the incidence angles of the light spots in the imaging unit 11 (their order when arranged from smaller to larger)' is satisfied and is known to be satisfied, then the projection angle of each of the light spots captured by the imaging unit 11 can be determined on this basis.

If the above condition (a) is not satisfied, or if it is not clear that the condition (a) is satisfied, it is necessary to determine the projection angle of each light spot in the captured image by estimation and the like through pattern matching with captured images (reference patterns) of projected patterns determined in advance for objects positioned at given distances. Such processing requires an extremely large amount of computation, however.

This invention enables accurate estimation of the projection angles of the light spots captured by the imaging unit 11 with a small amount of computation even when the condition (a) is not satisfied or when it is unclear that the condition (a) is satisfied.

With respect to light spots projected at varying angles in a plane perpendicular to the base line BL, the condition (a) is necessarily satisfied for the magnitude relationship among the angles in the vertical direction, so that 'permutations' in the order need not be considered.

The case in which the base line BL extends horizontally and the light spots in the pattern light are aligned horizontally and vertically as above will be further described below.

Figure 4:
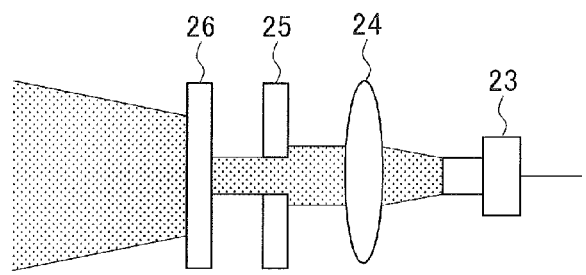
FIG. 4 is a schematic diagram illustrating the configuration of the projection unit 22 in FIG. 1.

Besides the projection unit 22, the pattern light generation unit 20 includes a drive unit 21 as shown in FIG. 1. As shown in FIGS. 1, and 4, the projection unit 22 includes a laser light source 23, a collimating lens 24, an aperture 25, and a diffraction grating 26.

Under control by the control unit 30, the drive unit 21 causes the laser light source 23 to emit light. The laser light emitted from the laser light source 23 is converted to collimated light by the collimating lens 24, and given a predetermined beam diameter by the aperture 25.

The diffraction grating 26 projects pattern light into the imaged space JS to generate a given projected pattern.

The imaging unit 11 includes a lens 12 and an imaging element 14, as shown in FIG. 1. The image acquisition unit 10 includes, besides the imaging unit 11, an A/D conversion unit 15, a separation unit 16, an image generation unit 17, a distance information generation unit 18, and a display processing unit 19.

The lens 12 focuses an image of the objects being imaged onto the imaging plane of the imaging element 14.

The imaging element 14 outputs imaging signals obtained by photoelectric conversion of the incident image. The imaging element 14 has a Bayer arrangement of R, G, and B pixels, for example, and outputs R, G, and B signals as the imaging signals.

The imaging unit 11 consisting of the lens 12 and the imaging element 14 images the objects OJ1, OJ2 in the imaged space JS. This imaging operation is performed at a given frame rate, so that multiple consecutive frame images are obtained.

When pattern light is projected onto the objects OJ1, OJ2, (a signal representing) an image in which an image (projected image component) of the light spots due to the projected pattern light is superimposed on the normal light (background component) from the objects OJ1, OJ2 is output from the imaging unit 11.

The A/D conversion unit 15 converts the output of the imaging unit 11 to, for example, an eight-bit (256-gradation) digital signal D15.

The separation unit 16 receives the output of the A/D conversion unit 15, that is, the A/D-converted imaging signal D15, and separates it into the projected image component and the background component. The image generation unit 17 generates a background image from the background component output from the separation unit 16. The distance information generation unit 18 generates distance information from the projected image component output from the separation unit 16.

The display processing unit 19 displays the distance information generated by the distance information generation unit 18 in association with the background image generated in the image generation unit 17. The (signal representing the) image associated with the distance information output from the display processing unit 19 is output to a display unit (not shown) or the like.

The control unit 30 controls the pattern light generation unit 20 and the image acquisition unit 10.

The control unit 30 controls, for example, the imaging mode, frame rate, exposure time, and so on of the imaging element 14 in the imaging unit 11 and sets the display mode, distance information display mode, and so on of the display processing unit 19. The control unit 30 also supplies the A/D conversion unit 15 with signals for controlling operational timings. In addition, the control unit 30 sets operating modes for the pattern light generation unit 20 and the image acquisition unit 10.

The control unit 30 also holds information Sdp indicating the relationship between identification codes (which will be described later) accompanying the individual light spots included in the projected pattern projected from the projection unit 22, and positions, in the projected pattern, of the light spots accompanied by the identification codes, information Spa indicating the correspondence relationship between positions on the projected pattern and the projection angles, information Szv indicating the axial direction and the view angle of the imaging unit 11, and information indicating the base line length Lpc, and supplies these items of information to the distance information generation unit 18.

The control unit 30 also performs control to synchronize the operation of the pattern light generation unit 20 and the operation of the image acquisition unit 10.

More specifically, the control unit 30 controls the imaging unit 11 so that imaging is repeated at a predetermined frame rate, while controlling the drive unit 21 so that the laser light source 23 is switched to a light emitting state and a light non-emitting state in alternate frames, and sends a signal Snf indicating whether the laser light source 23 is in the light emitting state or the light non-emitting state to the separation unit 16.

The frame rate of the imaging unit 11 is, for example, 30 fps, and (a signal representing) the image D11 for one frame is output from the imaging unit 11 during each frame period.

The timing of the imaging of each frame is controlled by the control unit 30.

Since the laser light source 23 in the projection unit 22 is switched between the light emitting state and the light non-emitting state at alternate frames, the projection unit 22 is switched between the state of projecting pattern light into the imaged space JS and the state of projecting no pattern light at alternate frames, and the imaging unit 11 can obtain images when the pattern light is projected and images when no pattern light is projected alternately, at every other frame.

From the images obtained when the pattern light is projected and the images obtained when no pattern light is projected, the separation unit 16 generates an image (the projected image component) due to the pattern light and an image (the background component) excluding the pattern light component. That is, it outputs the images obtained in the frame periods without projected pattern light as the background component, and outputs the images obtained by subtracting the images obtained in the frame periods without projected pattern light from the images obtained in the frame periods with projected pattern light as the projected image component, the subtraction being made between the images obtained in the frame periods occurring one after another.

FIG. 5 is a block diagram showing an example of the configuration of the separation unit 16.

In FIG. 5, the output (digital imaging signal) D15 of the A/D conversion unit 15 is supplied to an input terminal 60.

A frame delay unit 61 delays the digital imaging signal D15 supplied to the input terminal 60 by one frame and outputs a frame delayed imaging signal D61.

A difference calculation unit 62 determines the difference between the imaging signal D15 and the frame delayed imaging signal D61 (a difference obtained by subtracting the imaging signal of a frame in which the pattern light is not projected, from the imaging signal of a frame in which the pattern light is projected) and outputs a difference signal D62.

A switch 63 is closed when the imaging signal D15 of a frame in which the projection unit 22 does not project pattern light is supplied to the input terminal 60 and supplies the signal as the background component D63 to the image generation unit 17 via an output terminal 65.

FIGS. 6(a) to 6(d) show an example of the operation of the separation unit 16. In the illustrated example, as shown in FIG. 6(a), the pattern light is not projected in a first frame PS1 and a third frame PS3, and the pattern light is projected in a second frame PS2 and a fourth frame PS4. As a result, captured images such as those shown in FIG. 6(b) are obtained in the individual frame periods.

In the first frame PS1, the switch 63 is closed and the imaging signal D15 at that time (the imaging signal D15 in the first frame, that is, the signal D15 obtained by digital conversion of the output D11 of the imaging unit in the state without projected pattern light) is supplied as the background component D63 from the output terminal 65 to the image generation unit 17 (FIG. 6(d)). Simultaneously, the imaging signal D15 is input to the frame delay unit 61.

In the second frame PS2, the difference calculation unit 62 subtracts the output D61 of the frame delay unit 61 (the imaging signal of the first frame PS1) from the imaging signal D15 at that time (the imaging signal D15 in the second frame, that is, the signal D15 obtained by digital conversion of the output D11 of the imaging unit in the state with projected pattern light), and outputs the subtraction result (the difference) D62 (FIG. 6(c)).

In the third frame PS3, as in the first frame PS1, the switch 63 is closed, and the imaging signal D15 at that time is supplied as the background component D63 from the output terminal 65 to the image generation unit 17. In addition, the imaging signal D15 is input to the frame delay unit 61.

In the fourth frame PS4, as in the second frame PS2, the difference calculation unit 62 subtracts the output D61 of the frame delay unit 61 from the imaging signal D15 at that time and outputs the subtraction result (the difference) D62.

Similar processing is repeated subsequently and an image having only a background component and an image having only a projected image component are output in alternate frame periods.

The output of the imaging element 14 is, for example, an imaging signal with a Bayer arrangement of R pixel values, G pixel values, and B pixel values, and the output of the A/D conversion unit 15 is a corresponding digital signal. But for convenience of description, FIGS. 6(a) to 6(d) show images in which pixel values are obtained for all pixels, by interpolation.

The separation processing carried out by the frame delay unit 61, the difference calculation unit 62, and the switch 63 in the separation unit 16 is performed individually for each of R, G, and B, and interpolation (interpolation of the color components missing at each pixel in the Bayer arrangement) is performed on the R, G, and B components obtained as the result of separation, to generate all color components (R, G, and B components) for all pixels, and then the R, G, and B components of each pixel are combined to generate the luminance component of the pixel, and the luminance component is output as the projected image component.

The image generation unit 17 includes, for example, an image signal processing unit 72 as shown in FIG. 7, and applies a color interpolation process (interpolation of the color components missing at the position of each pixel in the Bayer arrangement), a gradation correction process, a noise reduction process, a contour correction process, a white balance adjustment process, a signal amplitude adjustment process, a color correction process, and so on, and outputs the image obtained as the result of these processes as the background image.

On the basis of the projected image component output from the separation unit 16 and the information about the projected pattern separately supplied from the control unit 30, the distance information generation unit 18 generates information indicating distances from the imaging unit 11 to the individual parts of the projected image. For the generation of the distance information in the distance information generation unit 18, a pattern including identification codes in addition to light spots is used as the projected pattern. Accordingly, before the operation of the distance information generation unit 18, is described, the projected pattern used in this embodiment will be described.

The projected image (projected pattern) projected by the projection unit 22 includes light spots arranged in a matrix fashion as shown in FIG. 2, as noted above and also includes, near each of the light spots, a dot group having a function of an identification code.

Figure 8:
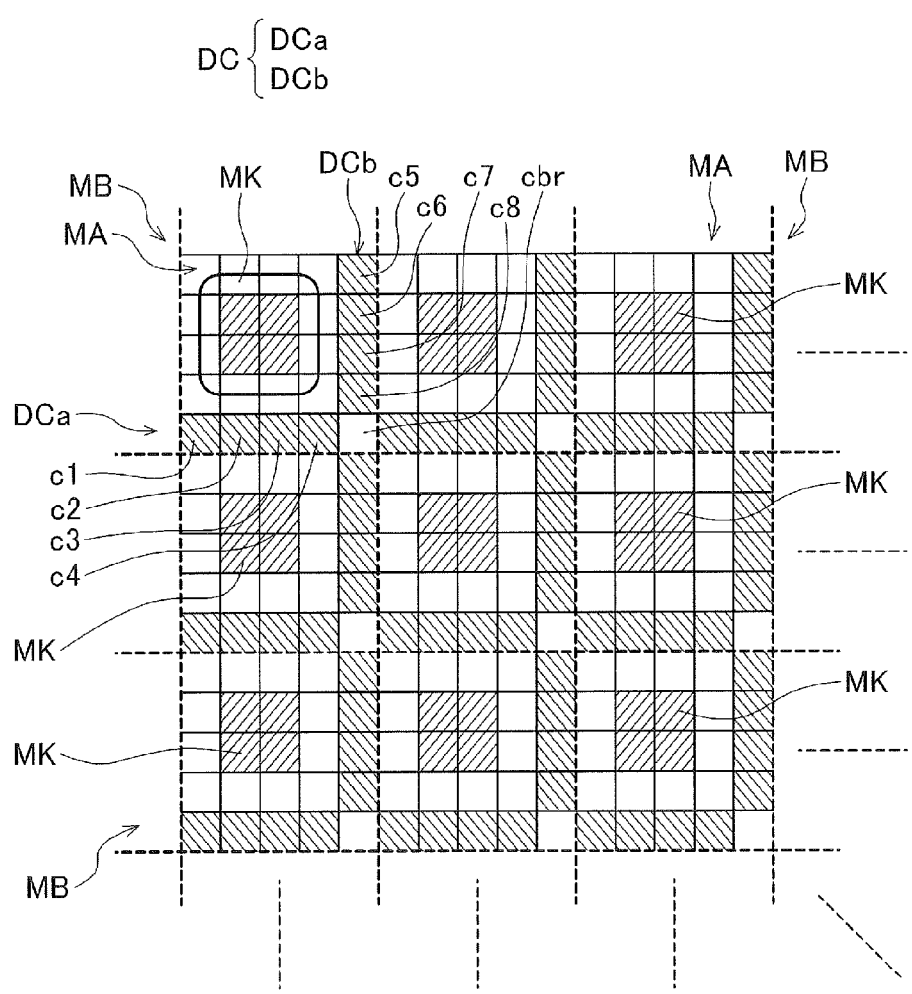
FIG. 8 is a diagram that shows an enlarged view of part of a projected pattern.

FIG. 8 shows an enlarged view of part of the projected pattern. To simplify the explanation, the following description will assume that the projected pattern is projected onto a plane perpendicular to the optical axis of the projection unit 22.

Each of the smallest squares indicates a dot position or a cell, which is the smallest unit in the projected pattern that can be controlled so that it is either on (the illuminated state) or off (the non-illuminated state). For example, an array of cells measuring 480 rows vertically and 650 columns horizontally is formed in the projection range. The cells that are in the illuminated state constitute the dots.

Each light spot MK is formed so as to occupy an area of cells in the on state, measuring two rows vertically and two columns horizontally. A light spot is also referred to as a position marker, or simply as a marker. The light spots and the dots may sometimes be collectively referred to as projected points.

The row above, the row below, the column to the right, and the column to the left of each two-row, two-column area are areas consisting of cells in the off state (cells that are not illuminated), and the four-row, four-column area including these areas and the two-row, two-column area is referred to as a spot area MA.

The row of cells adjacent to the lower side of the four-row, four-column spot area MA (the group of four mutually aligned dot positions adjacent to the lower side of the spot area MA) is the area constituting a first part DCa of the identification code. The column of cells adjacent to the right side of the spot area MA (the group of four mutually aligned dot positions adjacent to the right side of the spot area MA) is the area constituting a second part DCb of the identification code. The four cells in the first part DCa are indicated by respective reference characters c1-c4. The four cells in the second part DCb are indicated by respective reference characters c5-c8.

Each of the cells in the first part DCa and the second part DCb can assume either the on-state (the illuminated state) or the off state (the non-illuminated state), and the combination of on and off states of these cells constitutes an eight-bit identification code DC. The identification code DC accompanying each light spot MK is used to identify the light spot MK.

The cell cbr adjacent to the right end of the first part DCa, and therefore adjacent to the lower end of the second part DCb, is in the off state.

The entire projected pattern is a repeated collection of areas MB, each consisting of five rows and five columns of cells, including a four-row, four-column spot area MA, to which an identification code DC and a cell cbr are added.

The light spots MK, which are used to determine the position of each part of the projected pattern, consist of a two-row, two-column array of dots, so that they appear to occupy a relatively large area and as relatively high brightness parts in the imaging unit 11.

The identification code DC accompanying each light spot MK is used to determine which one among the many light spots included in the projected pattern the light spot MK is.

FIG. 9 shows an example of the identification codes used in the projected pattern. Fifty-six different 'values', that is, mutually differing on/off combinations, from No. 0 to No. 55, are used in the illustrated example. The value (on or off) of each of the cells from c1 to c8 constituting the identification code of each number (No.) is represented by '1' or '0'.

Figure 10:
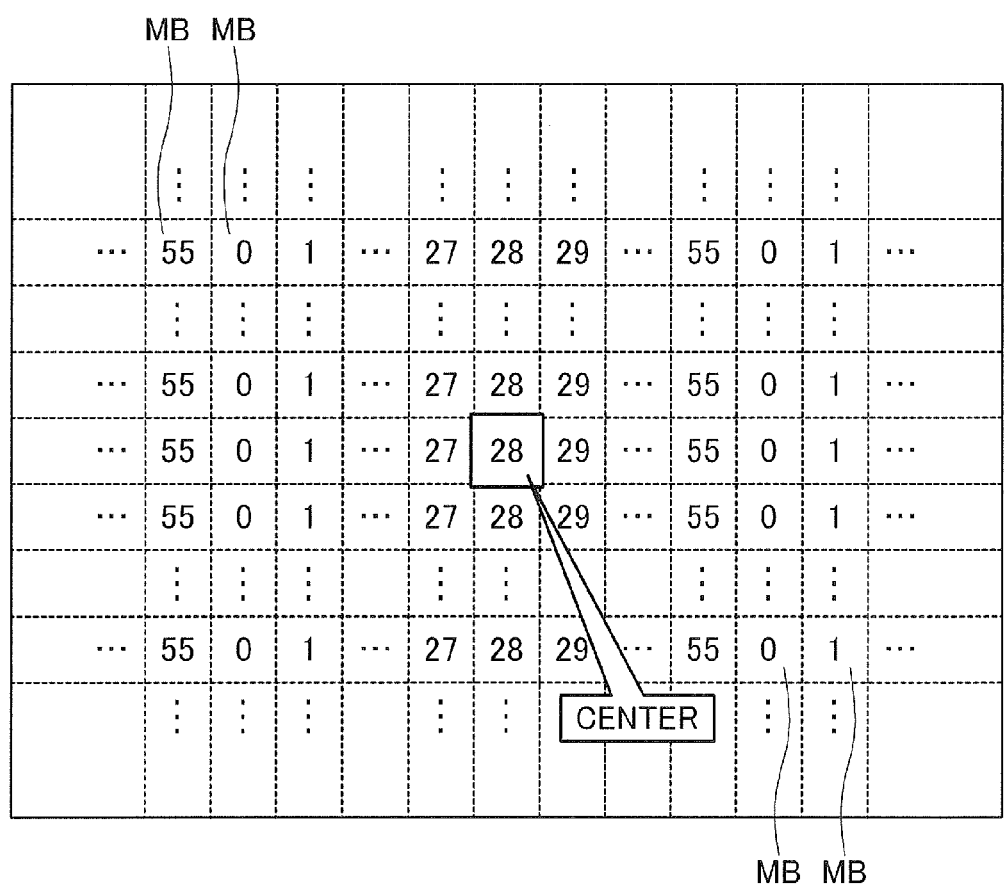
FIG. 10 shows an example of the arrangement of the identification codes in the projected pattern.

FIG. 10 shows an exemplary arrangement of identification codes in a projected pattern (an exemplary arrangement of areas, each consisting of a five-row, five-column array of cells, including an identification code). Each square in FIG. 10 corresponds to an area MB consisting of a five-row, five-column array of cells. The number in each square indicates the number (No.) of the identification code in FIG. 9.

In the example shown in FIG. 10, identical identification codes are lined up in the vertical direction and consecutive identification codes from No. 0 to No. 55 are lined up from left to right in the horizontal direction. After (on the right side of) No. 55, next No. 0 is stationed again, and a similar arrangement repeats (forming a cyclical arrangement) thereafter.

The projected pattern is arranged so that No. 28 is positioned in the center.

When the identification codes in FIGS. 8 and 9 are arranged as in FIG. 10, the array of the cells in the on-state and off-state (the array of on-state cells and the array of off-state cells) is point symmetric with respect to the center of the projected pattern (the center of the light spot MK in an area MB including the identification code No. 28 located midway in the vertical direction in the projected pattern).

In addition, between the identification codes accompanying the light spots that are mutually adjacent in the horizontal direction, there is always only one change in the on/off-state (one change from the on-state to the off-state or one change from the off-state to the on-state).

When the projected pattern is generated by use of a diffraction grating, projecting a pattern that is point symmetric with respect to the center of the projected pattern (a pattern that remains unchanged when rotated by 180 degrees around its center) can simplify the form of the diffraction grating, as compared with projecting a point asymmetrical pattern, thereby reducing the design and manufacturing cost of the diffraction grating.

In consideration of this point, in this embodiment, the arrangement of identification codes is determined so that the projected pattern is a pattern with a configuration that is point symmetric with respect to its center.

In addition, the number of cells in the on state in each identification code is four or less. The purposes of this are to facilitate discrimination of the light spot by preventing the identification code from appearing as bright as the light spot, and to facilitate pattern detection by increasing the brightness of the reduced number of cells in the on state when the image is captured.

When a projected pattern is generated by use of a diffraction pattern, if the intensity of the projected light from the light source is constant, as the number of projected points decreases, the luminance at each point increases, so that even if the ambient light intensity is strong, the position of the projected pattern in the captured image can easily be recognized. From this point of view, it is desirable for the number of on-state cells among the cells constituting each identification code to be small. In order to provide a projected pattern which is point symmetric, and which has the fifty-six identification codes required for discrimination between patterns, it is also necessary to use combinations including four cells in the on state as identification codes.

The shape of the projected pattern formed when the pattern light is projected onto a plane that is not perpendicular to the optical axis of the projection unit 22 is a quadrilateral other than a rectangle, and the rows and the columns of light spots are not mutually parallel, and the distances between the light spots are not uniform. In the projected pattern formed when the pattern light is projected onto a curved surface, the rows and the columns of light spots fail to form straight lines. When the surface onto which the pattern light is projected is bumpy, stepped, or otherwise uneven, the magnitude relationship between the incidence angles of the individual light spots (e.g., the order from smaller to larger) may not match the magnitude relationship between the projection angles of the individual light spots (e.g., the order from smaller to larger); 'permutations' may occur.

In order to know the projection angle at which each light spot is projected from the projection unit 22, it is necessary to identify the column in which the light spot is located in the matrix. The eight-bit identification code itself does not include enough information to identify the column. However, even when the order of the light spots is permuted, if the shift from the original position (order) of each light spot is within the range of the cycle of change in the 'value' of the identification code (the range corresponding to fifty-six areas MB, each consisting of cells in five rows and five columns, in the example of FIG. 10), it is possible to identify the non-permuted position (the original position). By identifying the original position, it is possible to identify the column in which the light spot accompanied by the identification code is located in the matrix.

'Permutations' occur because the imaging unit 11 and the projection unit 22 are disposed at horizontally different positions. Since the imaging unit 11 and the projection unit 22 are disposed at vertically identical positions, such permutations do not occur in the vertical direction, so that vertical position (order) in the projected pattern can be determined by detecting the order in the captured image. Therefore, codes for identifying the vertical order are unnecessary.

Figure 11:
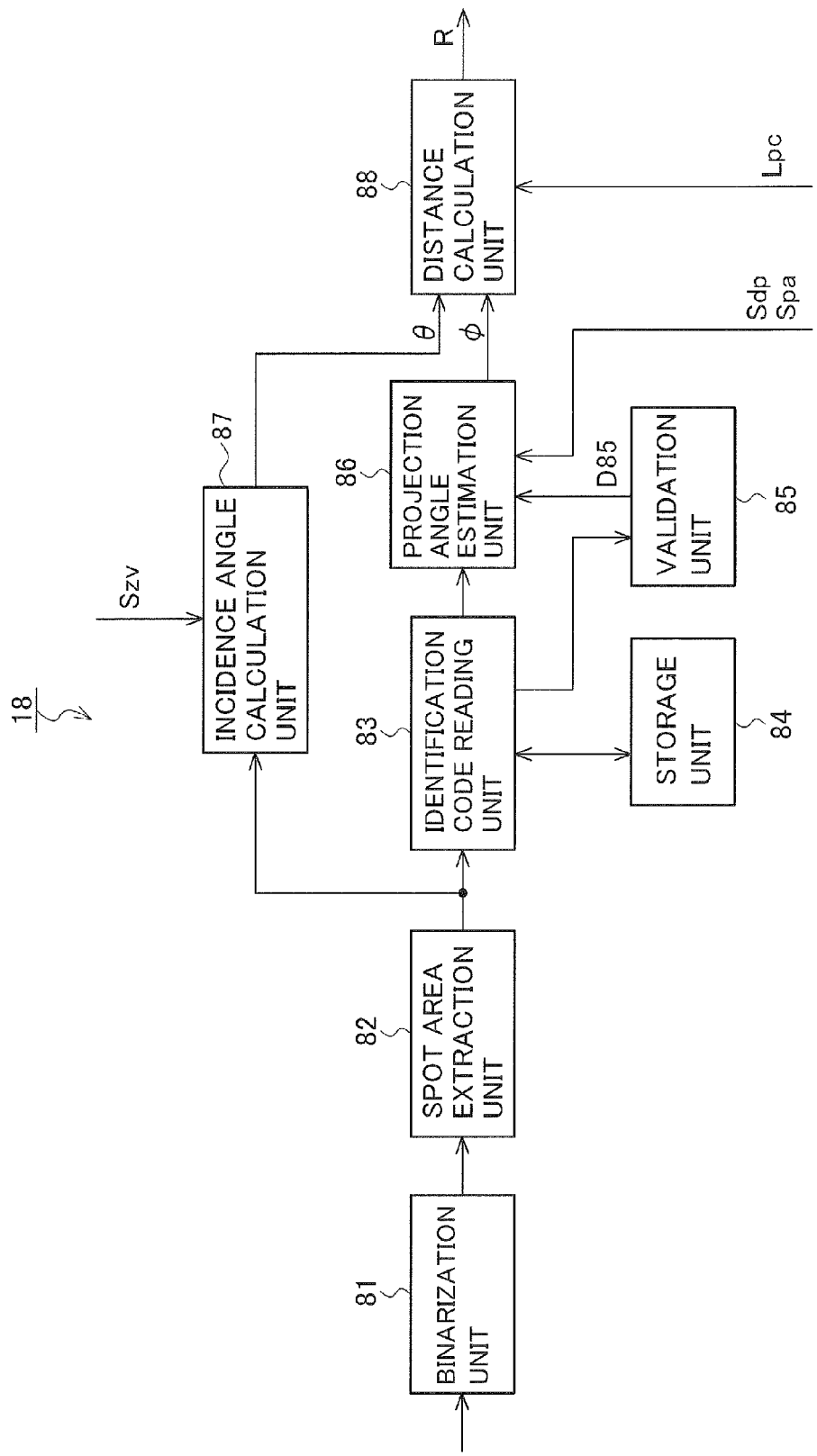
FIG. 11 is a block diagram showing an example of the configuration of a distance information generation unit in FIG. 1.

FIG. 11 shows an example of the configuration of the distance information generation unit 18.

The distance information generation unit 18 shown in FIG. 11 includes a binarization unit 81, a spot area extraction unit 82, an identification code reading unit 83, a storage unit 84, a validation unit 85, a projection angle estimation unit 86, an incidence angle calculation unit 87, and a distance calculation unit 88.

The binarization unit 81 binarizes the projected image component output from the separation unit 16 and outputs a binary projected image.

The spot area extraction unit 82 extracts, from the projected image, spot areas MA (the four-row, four-column areas in FIG. 8) centered on individual light spots.

The spot areas MA are extracted by searching for four-row, four-column groups of cells at fixed intervals, each group having four dots (on-state cells) in the middle two rows and the middle two columns surrounded by off-state cells (in the top and bottom rows and the right and left columns). The groups of four dots in the middle two rows and the middle two columns are regularly spaced at equal intervals in the projected pattern, so that the image obtained by imaging should satisfy a similar condition. In the captured image, however, due to curvature, bumps, steps, or other types of unevenness, in the surface of the imaged object, the intervals are not necessarily exactly equal, so that pattern matching or the like based on degree of similarity is performed to extract the spot areas MA.

The identification code reading unit 83 reads the identification codes DC from the identification code areas adjacent to the extracted spot areas MA.

Not only the first part DCa adjacent to the lower side and the second part DCb adjacent to the right side of each spot area MA are read, the part adjacent to the upper side (the first part (indicated by reference characters DCa') of the identification code for the light spot in the upper adjacent spot area) and the part adjacent to the left side (the second part (indicated by reference characters DCb') of the identification code for the light spot in the left adjacent spot area) are also read at this time. The values of the identification codes that are read are stored in the storage unit 84.

When the identification code reading unit 83 reads the identification code adjacent to the each spot area MA, if the upper adjacent identification code part (DCa') or the left adjacent identification code part (DCb') has already been read and stored in the storage unit 84, the value of this identification code part may be read from the storage unit 84. If the captured projected image is processed sequentially, starting from the upper left, then when the processing related to each spot area is performed, the processing of the upper and left adjacent spot areas has already been finished, so that their identification codes are stored in the storage unit 84 as described above and are available for use.

The validation unit 85 checks the validity of each identification code read by the identification code reading unit 83. If the result of this check is that the validity is doubtful (unreliable), the identification code that was read is not used in the subsequent processing.

Figure 12:
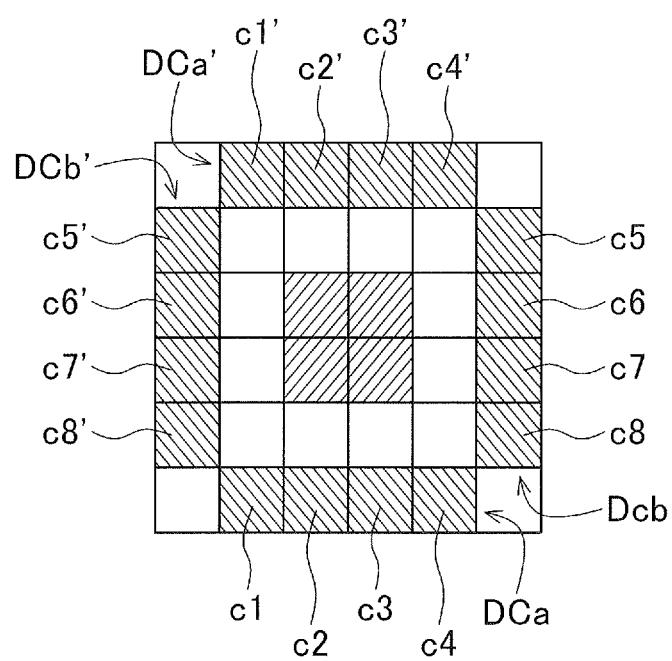
FIG. 12 is a diagram that shows identification codes positioned above, below, to the left of, and to the right of a spot area.

The validity determination uses, as shown in FIG. 12, the first identification code part DCa adjacently below, the second identification code part DCb adjacently to the right, the identification code part DCa' adjacently above, and the identification code part DCb' adjacent to the left of the each spot area MA.

In FIG. 12, as in FIG. 8, the states of the four cells (four bits) constituting the identification code part DCa are indicated by $c_1$-$c_4$ and the four bits constituting the identification code part DCb are indicated by reference characters $c_5$-$c_8$.

In addition, the states of the four cells (four bits) constituting identification code part DCa' are indicated by $c_1'$-$c_4'$, and the four bits constituting identification code part DCb' are indicated by reference characters c5'-c8'.

Since c1'-c4' accompany a light spot MK aligned in the upward direction, they should have the same values as c1-c4, respectively.

Since c5'-c8' accompany the next light spot MK to the left, according to the condition that 'there is always only one change in on/off-state between mutually adjacent identification codes', they should have the same values as c5-c8, or differ in only one bit.

A decision is accordingly made that if a condition that (b) 'c1-c4 are the same as c1'-c4' and c5-c8 are the same as c5'-c8' or differ in only one bit' is satisfied, then the identification code c1-c8 that has been obtained is valid, and if the condition (b) is not satisfied, then the identification code c1-c8 that has been obtained is not valid (low in reliability).

The condition (b) can also be rephrased as (b1) 'there is no more than one difference (change) between the second parts c5-c8 and c5'-c8' of the identification codes of the light spots adjacent in the horizontal direction, and the first parts c1-c4 and c1'-c4' of the identification codes of the light spots adjacent in the vertical direction are mutually identical', or as (b2) 'there is no more than one difference (change) between the identification code part c5-c8 adjacent to the right side and the identification code part c5'-c8' adjacent to the left side of each light spot, and the identification code part c1-c4 adjacent to the lower side and the identification code part c1'-c4' adjacent to the upper side are the same.'

The above assumes that bits c1'-c8' have already been determined to be valid.

In the state in which the validity of bits c1'-c8' has not yet been determined, it is also permissible to suspend the determination that any one of c1-c8 and c1'-c8' is invalid and make a comprehensive determination by utilizing the results of comparisons with other identification codes as well.

The projection angle estimation unit 86 receives the results of the reading of the identification codes from the identification code reading unit 83 and the validity check results D85 from the validation unit 85, and further obtains, from the control unit 30, data Sdp indicating the content of the table in FIG. 9 (information indicating the relationship between the identification codes and the positions in the projected pattern) and information Spa indicating the correspondence relationship between the positions in the projected pattern and the projection angles, based on all of which it estimates the projection angle $\phi$ of each light spot. When the above information, more specifically the data Sdp indicating the content of the table in FIG. 9 and the information Spa indicating the correspondence relationship between the positions in the projected pattern and the projection angles, is supplied from the control unit 30, this information may be held in a memory (not shown) in the projection angle estimation unit 86.

If the read result in the identification code reading unit 83 is determined to be invalid by the validation unit 85, the projection angle estimation unit 86 does not estimate the projection angle from the read result.

If the read result in the identification code reading unit 83 is determined to be valid by the validation unit 85, the projection angle estimation unit 86 estimates the projection angle from the read result.

In the estimation of the projection angle, which one of identification codes No. 0 to No. 55 in the table in FIG. 9 the value of the read identification code DC matches is determined (i.e., where the light spot to which it is assigned is positioned in the pattern is determined), and based on the determination result, the position of the light spot in the projected pattern is identified.

If the identification code is not present in the table in FIG. 9 (does not match any one of the identification codes assigned to the light spots in the pattern), a read error is declared and the read code is not used for determining the position of the light spot.

When the position of the light spot in the projected pattern has been identified, the projection angle $\phi$ is determined on the basis of the information Spa (supplied from the control unit 30) indicating the relationship between the identified position and the projection angle.

From the output of the spot area extraction unit 82, the incidence angle calculation unit 87 calculates the incidence angle $\theta$ of the light spot on the basis of the position in the captured image at which the light spot is imaged and the axial direction and the view angle of the imaging unit. The information Szv indicating the axial direction and the view angle is supplied from the control unit 30.

The distance calculation unit 88 calculates the distance to the surface of the imaged object onto which the light spot is projected on the basis of the projection angle $\phi$ estimated by the projection angle estimation unit 86, the incidence angle $\theta$ calculated by the incidence angle calculation unit 87, and the base line length Lpc supplied from the control unit 30.

First, the distance Z from the base line BL in FIG. 3 to the surface of the imaged object onto which the light spot is projected (the point at which the spot SP is formed), that is, the distance to the spot SP, can be obtained from the relation:

$$Z = Lpc/(\tan\phi - \tan\theta) \quad (1)$$

Equation (1) is obtained from the following relation in FIG. 3:

$$Z \cdot \tan\phi - Z \cdot \tan\theta = Lpc \quad (2)$$

Next, the distance R from the imaging unit to the surface (spot SP) of the imaged object on which the light spot is formed can be obtained from the distance Z to the base line BL obtained by the equation (1) and the incidence angle $\theta$ as follows:

$$R = Z/\cos\theta \quad (3)$$

Figure 13:
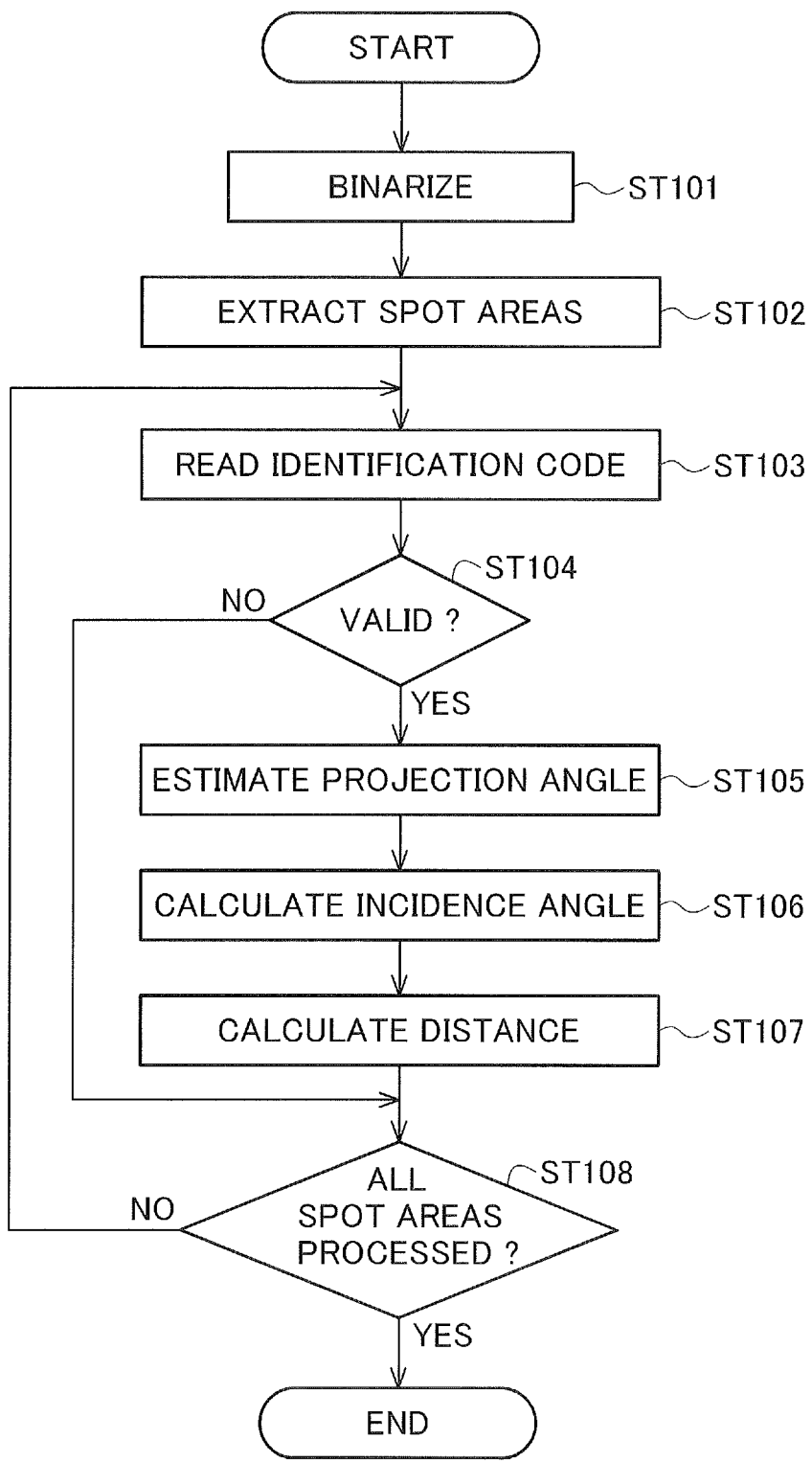
FIG. 13 is a diagram that illustrates a procedure of the processing carried out by the distance information generation unit in FIG. 1.

FIG. 13 illustrates a procedure of the processing carried out by the distance information generation unit 18 in FIG. 1.

First the projected image pattern is binarized (ST101).

Next, spot areas MA are extracted from the binarized projected image pattern (ST102).

Next, identification codes DC, DCa', and DCb' are read from the identification code areas adjacent to a spot area MA (ST103).

Next, the validity of the identification code is determined (ST104).

If the identification code is valid, the projection angle $\phi$ is estimated (ST105).

Next, the incidence angle $\theta$ is calculated (ST106).

Next, the distance is calculated by using the projection angle $\phi$ and the incidence angle $\theta$ (ST107).

Whether or not steps ST103 to ST107 have been performed for all the spot areas MA in the captured projected image is now determined (ST108), and if all have been processed, the process is terminated.

If a not-valid (No) decision is made in step ST104, the process proceeds to step ST108.

From the above process, the distance to the surface (spot SP) of the imaged object onto which each light spot is projected can be obtained.

In this case, even if the order of incidence angles to the imaging unit differs from the order of the projection angles in the projection unit (even if a permutation occurs), the use of the identification codes enables determination of the positions in the projected pattern, of the light spots in the captured image. It is therefore possible to identify the positions in the projected pattern, estimate the projection angles, and calculate the distances, accurately and with a small amount of computation.

The display processing unit 19 displays the distance information in association with the background image.

FIGS. 14(*a*) and 14(*b*) show exemplary images output by the display processing unit 19.

FIG. 14(*a*) shows a background image, and

FIG. 14(*b*) shows an image with distance information.

As the image with distance information, an image with brightnesses or colors assigned to distances is displayed. For example, an image in which the background image is represented by brightness and the distance is represented by color is displayed. Alternatively, an object present in the imaged space is recognized and an image in which text information expressing the distance to the object is displayed, being superimposed on the background image is output.

It is also possible to use, for example, two display screens, the background image in FIG. 14(*a*) being displayed on one of them, the image with distance information shown in FIG. 14(*b*) being displayed on the other one; or the background image shown in FIG. 14(*a*) and the image with distance information shown in FIG. 14(*b*) may be displayed alternately on one display screen; or the image selected by a user operation may be displayed. In this case, the image with distance information is preferably displayed in synchronization with the background image, with the same view angle and the same number of pixels.

As described above, according to this embodiment, distance can be determined with a small amount of computation.

When a pattern is projected by use of a diffraction grating, a point symmetrical pattern can facilitate the design of the diffraction grating and reduce its cost.

In addition, limiting the number of on-state cells in each identification code DC to four at most facilitates recognition of the light spots, and reduces the number of dots (constituted of the on-state cells), so that the brightness of the dots can be increased, and pattern detection in camera imaging can be facilitated.

In the above embodiment, if the condition (b) is satisfied, the identification code $c_1$-$c_8$ that has been obtained is determined to be valid; if the condition (b) is not satisfied, the identification code $c_1$-$c_8$ that has been obtained is determined to be invalid (low in reliability). Alternatively, by using the fact that:

(c) there is always only one change in on/off-state (one change from the on-state to the off-state or one change from the off-state to the on-state) between the identification codes of light spots that are mutually adjacent in the horizontal direction, the identification codes of adjacent light spots may be compared to determine the validity of the results of the reading of the identification codes.

For example, as shown in FIG. 15, the identification code consisting of the cells $c_1$-$c_8$ below and to the right of each light spot MK is compared with the identification code consisting of the cells $c_1$-$c_8$ below and to the right of the left adjacent light spot MK', and when a condition that:

(c1) 'the identification code consisting of the cells $c_1$-$c_8$ below and to the right of each light spot differs from the identification code consisting of the cells $c_1$-$c_8$ below and to the right of the left adjacent light spot by one bit' is satisfied, it may be determined that the obtained identification code $c_1$-$c_8$ is valid; when the condition (c1) is not satisfied, it may be determined that the obtained identification code $c_1$-$c_8$ is invalid (low in reliability).

As an identification code DC, the above example uses a code including the first part DCa consisting of horizontally aligned cells adjacent to the lower side of the spot area and the second part DCb consisting of vertically aligned cells adjacent to the right side of the spot area. The code, however, may include only one of the first part and the second part. The first part may be adjacent to the upper side of the spot area. The second part may be adjacent to the left side of the spot area. Alternatively, the identification code may include just one of a part consisting of horizontally aligned cells such as the first part and a part consisting of vertically aligned cells such as the second part.

The first embodiment uses a configuration in which the imaging unit 11 and the projection unit 22 are disposed so that they are horizontally aligned and the identification code enables a light spot to be discriminated from light spots present at other positions in the horizontal direction. But a configuration in which the imaging unit 11 and the projection unit 22 are disposed so that they are vertically aligned and the identification code enables a light spot to be discriminated from light spots present at the other positions in the vertical direction may also be used.

In summary, it is only necessary to use an identification code that enables a light spot to be discriminated from other light spots present at different positions in the direction in which the imaging unit 11 and the projection unit 22 are aligned (the first direction in the space in which the imaging unit 11 and the projection unit 22 are placed).

If the direction in the projected pattern corresponding to the direction in which the imaging unit 11 and the projection unit 22 are aligned is referred to as the first direction and the direction perpendicular to the first direction is referred to as the second direction, the conditions (b1) and (b2) described with reference to FIG. 12 can be stated in more general terms as:

(d1) 'there is no more than one difference (change) between the second parts ($c_5$-$c_8$ and $c_5'$-$c_8'$) of the identification codes of the light spots adjacent in the first direction, and the first parts ($c_1$-$c_4$ and $c_1'$-$c_4'$) of the identification codes of the light spots adjacent in the second direction are identical to each other'; and (d2) 'for each light spot, there is no more than one difference (change) between the identification code part ($c_5$-$c_8$) adjacent on one side in the first direction and the identification code part ($c_5'$-$c_8'$) adjacent on the other side in the first direction, and the identification code part ($c_1$-$c_4$) adjacent on one side in the second direction and the identification code part ($c_1'$-$c_4'$) adjacent on the other side in the second direction are identical';

the condition (c) described with reference to FIG. 15 can be represented as (e) 'there is only one difference between the identification codes of light spots that are adjacent in the first direction';

in any of these cases, whether the results of the reading of the identification codes are valid or not is determined according to whether or not these conditions are satisfied.

Furthermore, whether the results of the reading of the identification codes are valid or not may be determined according to whether or not the condition (d1) or (d2) and the condition (e) are both satisfied.

Second Embodiment

The configuration of the second embodiment of the invention is shown in FIG. 1, as in the first embodiment. As the distance information generation unit 18, however, the one illustrated in FIG. 16 is used.

The distance information generation unit 18 in FIG. 16 is substantially identical to the one in FIG. 11, but differs in that a distance range calculation unit 89 is added.

The distance range calculation unit 89 estimates a range of distances to the surface of an imaged object on which a light spot is projected, from the ratio between the size of the spot area MA in the captured image and the size of the dot forming the light spot (the size of the part with relatively high brightness in each cell in the image obtained by imaging).

If the distance calculated on the basis of the projection angle is not within the range of distances calculated by the distance range calculation unit 89, the distance calculation unit 88 infers that the result of the calculation based on the projection angle is low in reliability.

The method used in the distance range calculation unit 89 to calculate the range of distances will now be described with reference to FIGS. 17(a) and 17(b).

Figure 17A:
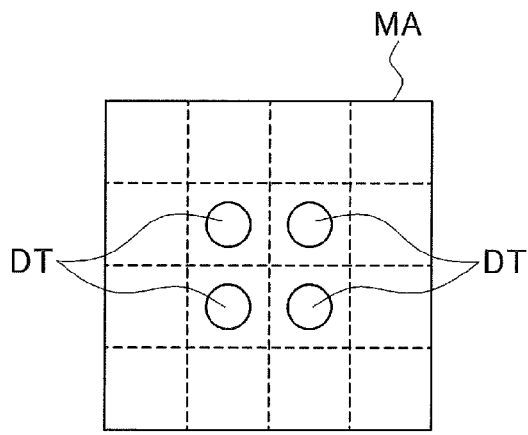
FIGS. 17(a) and 17(b) are diagrams that show the proportion in size between light spots and spot areas on objects at different distances.
Figure 17B:
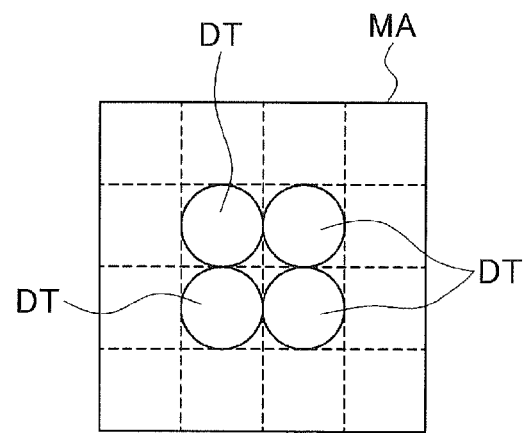

FIGS. 17(a) and 17(b) illustrate ratios between the size of the spot area MA and the size of the dot DT constituting the light spot MK in relation to the distance to the imaged object.

When the projected pattern is projected by use of the combination of the laser light source and the diffraction grating, a dot in the pattern is formed by a point beam of laser light collimated by the collimating lens, so that the size of the dot itself does not change, regardless of the distance to the imaged object. The size of the entire pattern, on the other hand, depends on the mutual distances of the diffracted dots. Since the diffracted beams forming different dots are not parallel to each other but are projected radially from the projection unit 22, the distance between the dots widens as the distance to the imaged object increases. Therefore, the size of the projected pattern and thus the ratio between the size of the spot area MA and the size of the dot DT varies according to the distance to the imaged object, and by measuring this ratio, the possible range of distances to the imaged object is found.

The resolution (number of pixels) of the imaging element needs to be high enough to detect changes in the ratio of the size of each dot to the size of the spot area MA. Specifically, the number of pixels in the horizontal direction and the number of pixels in the vertical direction in the imaging element needs to be sufficiently higher than, respectively, the number of dot positions (cells) in the horizontal direction and the number of dot positions (cells) in the vertical direction in the projected pattern, preferably by a factor of, for example, about ten or more.

Figure 18:
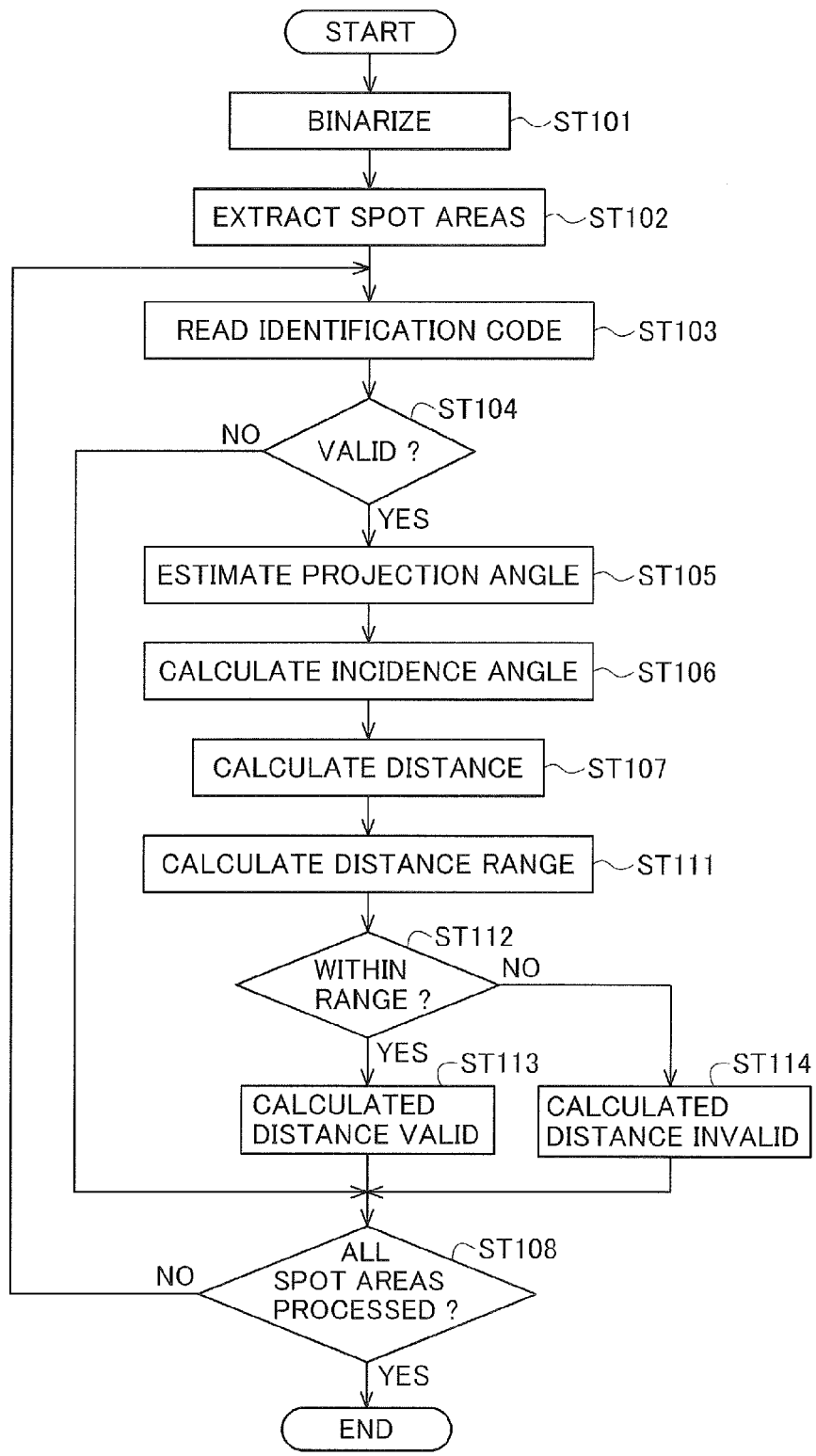
FIG. 18 is a diagram that illustrates a procedure of the processing carried out by the distance information generation unit in FIG. 16.

FIG. 18 illustrates a procedure of the processing in the distance information generation unit 18 in the second embodiment.

The processing in FIG. 18 is the same as in FIG. 13, except that steps ST111 to ST114 are added.

In step ST111, a range of distances to the surface of an imaged object on which dots are formed is estimated from the ratio between the size of the dot and the size of the spot area MA.

In step ST112, whether or not the distance obtained in step ST107 is within the range of distances obtained in step ST111 is determined. If it is within the range of distances (Yes), the distance obtained in ST107 is decided to be valid (ST113), processing based on the result of this decision is performed, and the processing proceeds to step ST108. If it is not within the range of distances (No), the distance obtained in step ST107 is decided to be invalid (ST114), processing based on the result of this decision is performed, and the processing proceeds to step ST107.

In regard to points other than the above, the second embodiment is the same as the first embodiment.

As described above, by narrowing the range of possible distances to an imaged object on the basis of the ratio between the size of the spot area MA and the size of the dot DT forming the light spot, erroneous detection of light spots can be reduced and the accuracy of detection of the distance to the imaged object can be enhanced.

The variations described in the first embodiment are also applicable to the second embodiment.

Third Embodiment

Figure 19:
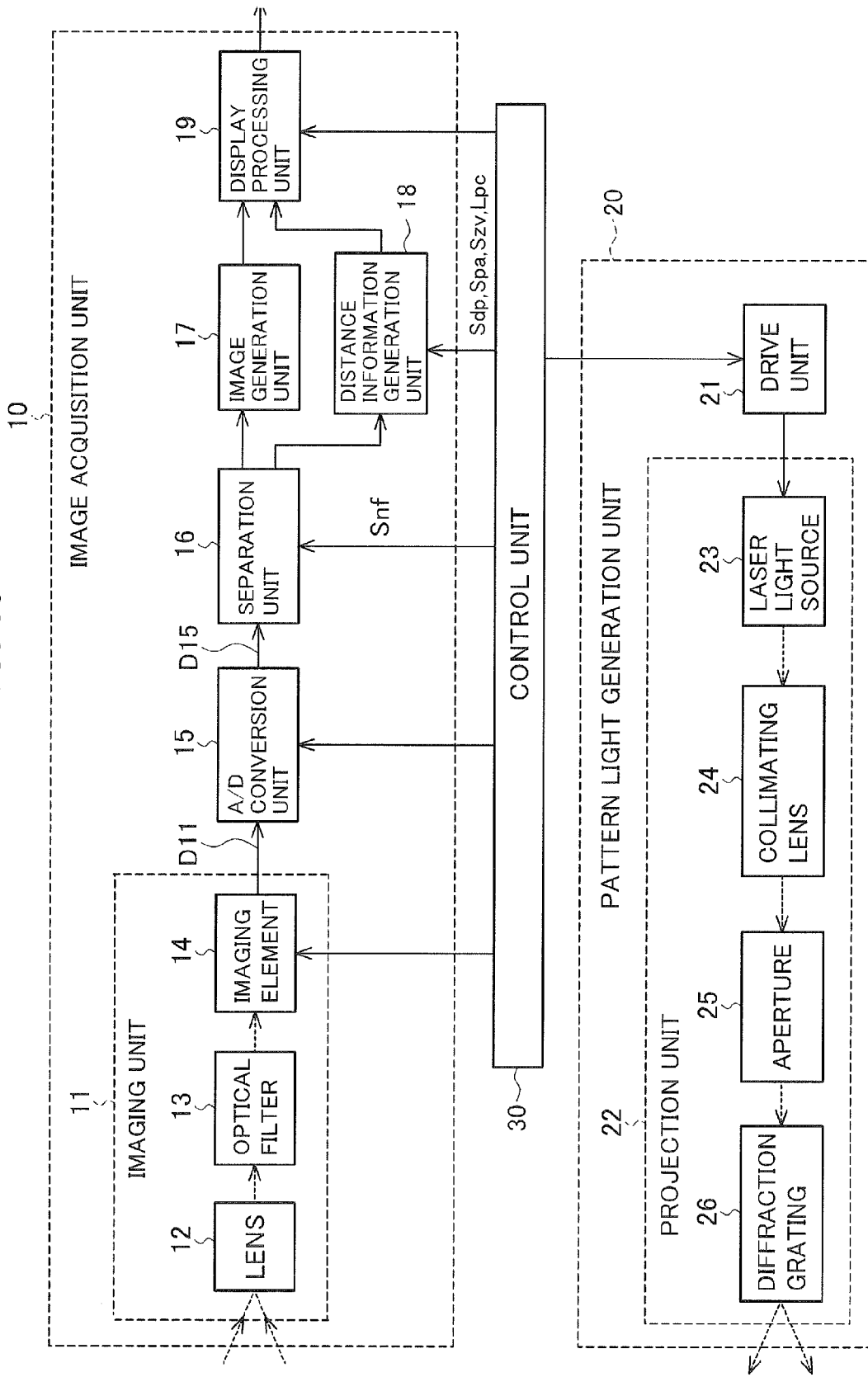
FIG. 19 is a block diagram showing an image generation device in a third embodiment of the invention.

FIG. 19 is a block diagram showing the configuration of an image generation device in a third embodiment of the invention.

The illustrated image generation device is substantially the same as the one shown in FIG. 1, but differs in that the imaging unit 11 includes an optical filter 13.

The optical filter 13 is a spectral filter, which operates with a given wavelength characteristic in transmitting incident light. Specifically, it is has a characteristic having a lower transmittance in the wavelength band of visible light than at the wavelength of projected pattern light.

The significance of using the optical filter 13 will now be described.

Figure 20:
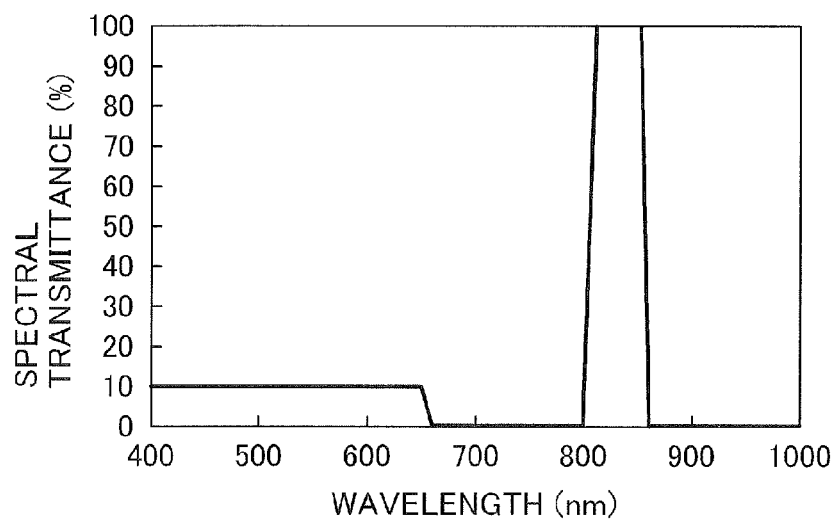
FIG. 20 is a diagram that shows an exemplary light transmission characteristic of an optical filter 13 in FIG. 19.

An exemplary spectral transmission characteristic of the optical filter 13 is shown in FIG. 20. With the characteristic shown in FIG. 20, 100% transmission takes place in a wavelength band centered on 830 nm, which is the wavelength of the projected pattern light, that is, the emission wavelength of the laser light source 23; transmission is limited to a prescribed transmittance in the wavelength band of visible light; and no transmission takes place in other wavelength bands.

The prescribed transmittance in the visible light wavelength band is set on the basis of the spectral distribution and the brightness of the ambient light in the imaged space JS and the intensity of the light in the projected pattern projected by the projection unit 22, especially the light intensity of each dot.

When there is no optical filter 13, the ambient light component, which is distributed with high power, being centered on the visible wavelength band, is dominant in the imaging signal D11 output from the imaging element 14, and the pattern light component, which is restricted to the wavelength band centered on 830 nm, accounts for only a tiny share, making it difficult to extract the pattern light component.

In this embodiment, therefore, the optical filter 13 is provided, and the pattern light component is imaged with 100% transmittance, while the ambient light component is imaged with attenuation, thereby to facilitate separation or extraction of the projected image component from the imaging signal.

If the ratio between the projected image component and the background component in the imaging signal D11 output from the imaging element 14 is 1:64, then about four of the 256 gradation steps of the eight-bit imaging signal D15 obtained by the A/D conversion of the imaging signal D11 represent the projected image component.

In principle, separation is possible if the difference between the background component and the sum of the projected image component and the background component is one gradation step or more. But, by allowing for the influence of noise, the above-mentioned difference is set to have a value equal to or greater than a prescribed number of gradation steps. The prescribed number of gradation steps is set to a number obtained by adding the number of gradation steps of the anticipated noise component to the minimum one gradation step required when there is no noise.

The transmittance of the optical filter 13 in the wavelength band visible light is set so that the ratio between the projected image component and the background component is 1:64, for example.

The light intensity of each dot in the projected pattern depends on the emission power of the laser light source 23 and the number of dots formed. The illuminance at each wavelength of ambient light depends on the spectroscopic radiation characteristic of the ambient light source; the quantity of light can be calculated from the spectroscopic radiation characteristic.

An example in which the emission wavelength of the laser light source 23 is 830 nm has been described in the third embodiment. However, any laser light source having an emission wavelength at which the radiance of the spectral radiance characteristic of the ambient light source is weak may be used.

Since the imaging element in the third embodiment is provided with the optical filter having a spectral transmission characteristic, the pattern light component can be extracted by minimizing the influence of the dominant ambient light component, distance measurement is possible even in a high brightness environment, and the distance information associated with the image can be obtained. Since both the background image and the distance information can be obtained by use of a single imaging element, the background image due to ambient light has exactly the same view angle as the image giving the distance information, and the distances to the imaged objects appearing in the image can be acquired accurately.

As the optical filter 13, a filter which has transmissive characteristics in the visible wavelengths band and at the wavelength of the projected pattern light, with the transmittance in the visible wavelength band being set lower than the transmittance at the wavelength of the projected pattern light is used, so that in the output of the imaging element 14, the ambient light component in the visible wavelength band that interferes with the extraction of the pattern light component can be reduced, enabling highly precise extraction of the pattern light component, allowing distance measurement even in a bright environment, and making it possible to obtain the distance information in association with the image.

In the first, second, and third embodiments, an imaging element with a Bayer arrangement of RGB pixels is used as the imaging element 14. But a monochrome imaging element can also operate as described above and provide the same effects.

Fourth Embodiment

The configuration of the fourth embodiment of the invention is shown in FIG. 19, as in the third embodiment. As the image generation unit 17, however, the one illustrated in FIG. 21 is used.

Figure 21:
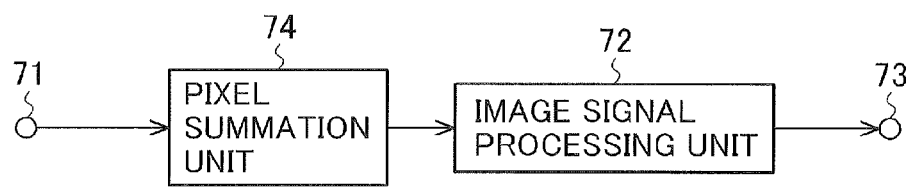
FIG. 21 is a block diagram showing an example of the configuration of an image generation unit used in a fourth embodiment of the invention.

The image generation unit 17 shown in FIG. 21 includes an image signal processing unit 72 similar to the one shown in FIG. 7, and, in addition, a pixel summation unit 74.

The imaging signal not including the projected image component, output from the separation unit 16 (the signal indicating the background component) is applied to an input terminal 71 in FIG. 21.

The pixel summation unit 74 adds, to the pixel value of each of the R, G, and B pixels (the pixel of interest) in the Bayer arrangement of R pixels, G pixels, and B pixels output from the output terminal 65 of the separation unit 16, the pixel values of pixels with the same color, located around that pixel of interest, thereby outputting a signal having an amplified pixel value.

FIGS. 22(a) to 22(c) show the pixels which are added to the pixel of interest. In FIGS. 22(a) to 22(c), each of the smallest squares represents one pixel.

When the pixel of interest is the R pixel RR34 as shown in FIG. 22(a), eight pixels added as surrounding pixels are: the pixel RR12 in the second row above and the second column to the left, the pixel RR32 in the second row above and the same column, the pixel RR52 in the second row above and the second column to the right, the pixel RR14 in the same row and the second column to the left, the pixel RR54 in the same row and the second column to the right, the pixel RR16 in the second row below and the second column to the left, the pixel RR36 in the second row below and the same column, and the pixel RR56 in the second row below and the second column to the right.

Accordingly, the summation result NRR34 is represented by the following equation.

$$NRR34 = RR12 + RR32 + RR52 + RR14 + RR34 + RR54 + RR16 + RR36 + RR56$$

The case in which the pixel of interest is RR34 has been described above. With respect to the R pixels at other positions, surrounding pixels having the same positional relationship as the above are added.

When the pixel of interest is the G pixel GB33 as shown in FIG. 22(b), eight pixels added as surrounding pixels are: the pixel GB31 in the second row above and the same column, pixel GR22 in the first row above and the first column to the left, the pixel GR42 in the first row above and the first column to the right, the pixel GB13 in the same row and the second column to the left, the pixel GB53 in the same row and the second column to the right, the pixel GR24 in the first row below and the first column to the left, the pixel GR44 in the first row below and the first column to the right, and the pixel GB35 in the second row below and the same column.

Accordingly, the summation result NGB33 is represented by the following expression.

$$NGB33 = GB31 + GR22 + GR42 + GB13 + GB33 + GB53 + GR24 + GR44 + GB35$$

The case in which the pixel of interest is GB33 has been described above. With respect to the G pixels at other positions, surrounding pixels having the same positional relationship as the above are added.

When the pixel of interest is the B pixel BB43 as shown in FIG. 22(c), eight pixels added as surrounding pixels are: the pixel BB21 in the second row above and the second column to the left, the pixel BB41 in the second row above and the same column, the pixel BB61 in the second row above and the second column to the right, the pixel BB23 in the same row and the second column to the left, the pixel BB63 in the same row and the second column to the right, the pixel BB25 in the second row below and the second column to the left, the pixel BB45 in the second row below and the same column, and the pixel BB65 in the second row below and second column to the right.

Accordingly, the summation result NBB43 is represented by the following equation.

$$NBB43 = BB21 + BB41 + BB61 + BB23 + BB43 + BB63 + BB25 + BB45 + BB65$$

The case in which the pixel of interest is BB43 has been described above. With respect to B pixels at other positions, surrounding pixels having the same positional relationship as the above are added.

The above summing process mixes the surrounding pixels in the same frame with the pixel of interest. As the surrounding pixels generally have the same value as the pixel of interest, the effect is to amplify the signal component.

If the pixel values of eight surrounding pixels are added to each pixel of interest as described above, for example, (and if the surrounding pixels are assumed to have the same pixel value as the pixel of interest), the summation result is nine times the pixel value of the pixel of interest.

As a result of adding (mixing) the surrounding pixels, however, the resolution (static resolution) is degraded.

Instead of adding surrounding pixels in the same frame to the pixel of interest, pixels at the same position as the pixel of interest in different frames, that is, frames preceding and following the frame including the pixel of interest, may be added.

In this case, the preceding and following frames are not limited to the single immediately preceding frame and the single immediately following frame; the preceding and following frames may be a given number of immediately preceding frames and a given number of immediately following frames.

Adding pixels at the same position in different frames enables the signal component to be amplified while avoiding loss of static resolution, and is particularly effective for scenes with little motion.

In the case of scenes with increased motion, however, motion blur is increased.

Both surrounding pixels in the same frame and pixels at the same position in different frames may be added to the pixel of interest, and in addition, pixels surrounding pixels at the same position in the different frames may be added.

In this manner, the amplification factor of the signal component can be further increased.

The image signal processing unit 72 applies a gradation correction process, a noise reduction process, a contour correction process, a white balance adjustment process, a signal amplitude adjustment process, a color correction process, and so on to the output signal of the pixel summation unit 74, and outputs the resultant image signal, as the background image, from an output terminal 73.

As in the third embodiment, a filter having the spectral transmission characteristic shown in FIG. 20 is used as the optical filter 13. However, in the present embodiment the transmittance in the visible wavelength band is set on the basis of the number of pixels summed in the pixel summation unit 74. For example, the transmittance is set to smaller values as the number of pixels summed by the pixel summation unit 74 increases. More specifically, the transmittance of the optical filter 13 is set to the reciprocal of the number of pixels summed in the pixel summation unit 74. If the pixel summation unit 74 sums nine pixels, for example, the transmittance is set to ⅑ (11.1%).

It is sufficient if the pixel summation unit 74 is able to restore the brightness of the image to compensate for the attenuation in the visible wavelength band caused by the optical filter 13, while holding the loss of resolution to a minimum. Accordingly, any type of signal processing other than the addition of surrounding pixels may be applied.

For example, by detecting correlations between pixel values, and selecting and summing strongly correlated pixels, the loss of resolution in the background image can be further reduced.

In the examples shown in FIGS. 22(a) to 22(c), the pixel summation unit 74 adds eight surrounding pixels to the pixel of interest. It may be so configured that the transmittance of the optical filter 13 in the visible wavelength band is set and the number of surrounding pixels that are added is increased or decreased according to the ratio between the ambient light component and the pattern light component. This makes it possible not only to extract the pattern light component but also to obtain a bright background image.

Like the first, second, and third embodiments, the fourth embodiment also permits the use of a monochrome imaging element, instead of an imaging element with a Bayer array of R, G and B pixels, as the imaging element 14, with similar operation and similar effects. Furthermore, the use of a monochrome imaging element in the fourth embodiment enables pixels at closer positions to be summed, so that an image with less loss of resolution can be generated as the background image.

According to the fourth embodiment, the image generation unit 17 is provided with the pixel summation unit 74 for mixing the surrounding pixels to amplify the signal component. Therefore, even when the quantity of incident light of the background image component entering the imaging element 14 is reduced by setting the transmittance of the optical filter 13 in the visible wavelength band to a value lower than the transmittance of the wavelength of the pattern light, the mixing of the surrounding pixels enables a bright background image to be reconstructed. Therefore, distance measurement is possible even in a bright illuminance environment, the distance information associated with the image can be obtained, and a bright background image can also be obtained.

In this case, if the signal component is amplified by mixing of the pixels located around the pixel of interest in the same frame as the pixel of interest, a bright background image can be reconstructed without motion blur even when an imaged object is moving rapidly.

If the signal component is amplified by mixing of the pixels located at the same position as the pixel of interest in the frames preceding and following the frame including the pixel of interest, loss of static resolution can be reduced, so that even for an imaged object having fine patterns and a complex contours, loss of resolution can be minimized and a bright, clear background image can be reconstructed.

The use of the optical filter 13 with transmittance in the visible wavelength band set to the reciprocal of the number of summed pixels (the amplification factor) of the pixel summation unit 74 enables the reconstruction of a background image having substantially the same brightness as before being attenuated by the optical filter 13. Together with this, an imaging signal with a reduced ambient light component in the visible wavelength band which interferes with extraction of the pattern light component can be obtained, enabling highly precise extraction of the pattern light component, allowing distance measurement even in a bright environment, and making it possible to obtain the distance information in association with the image.

The fourth embodiment has been described as a variation of the third embodiment, but the features described in the fourth embodiment may also be added to either the first or second embodiment.

The first, second, third, and fourth embodiments use a laser as the light source in the projection unit 22. But similar operation and similar effects can be obtained by use of some other type of light source instead, such as an LED, as long as the incident light characteristics of the diffraction grating are satisfied.

In the first, second, third, and fourth embodiments, the projection unit 22 having a configuration in which a pattern formed in the diffraction grating 26 is projected by the laser light source 23 has been described. But similar operation and similar effects can also be obtained from a configuration that projects a pattern by scanning a laser beam two-dimensionally at a high speed (the entire field of view being scanned within one frame period).

The first, second, third, and fourth embodiments use a diffraction grating as an element for forming pattern light. But similar operation and similar effects can also be obtained by use of a spectral pattern projection device such as, for example, the transmissive computer generated hologram described in paragraphs 0003 and 0004 in patent reference 3.

As described above, according to the present invention, an image generation device is obtained with which information about the distance to an object present in an imaged space can be obtained in association with the captured image. In addition, only one imaging element need be used. The image generation device according to the invention can simultaneously acquire, for example, an image of an intruder and the distance to the intruder, so that it can be used to detect intrusion in monitoring applications. The image generation device according to the invention is also applicable to driving assistance, such as parking assistance, by the detection of obstacles in front of and behind a vehicle.

REFERENCE CHARACTERS 10 image acquisition unit, 11 imaging unit, 12 lens, 13 optical filter, 14 imaging element, 15 A/D conversion unit, 16 separation unit, 17 image generation unit, 18 distance information generation unit, 19 display processing unit, 20 pattern light generation unit, 21 drive unit, 22 projection unit, 23 laser light source, 24 collimating lens, 25 aperture, 26 diffraction grating, 30 control unit, 61 frame delay unit, 62 difference calculation unit, 63 switch, 72 image signal processing unit, 74 pixel summation unit, 81 binarization unit, 82 spot area extraction unit, 83 identification code reading unit, 84 storage unit, 85 validation unit, 86 projection angle estimation unit, 87 incidence angle calculation unit, 88 distance calculation unit, 89 distance range calculation unit.

What is claimed is:

1. An image generation device comprising:
a projection device that projects pattern light of a prescribed wavelength into an imaged space creating a projected pattern;
an imaging device that images the imaged space;
a separation device that separates a projected image component from an imaging signal obtained by imaging by the imaging device by taking a difference between the imaging signal obtained when the pattern light is projected and the imaging signal obtained when the pattern light is not projected; and
a distance information generation device that generates distance information on a basis of a projected image component separated by the separation device; wherein
the distance information generation device determines projection angles of light spots in the projected pattern from an arrangement of the light spots in a projected image represented by the projected image component and a prestored relationship between the projection angles and positions of the light spots in the projected pattern, and determines a distance to a surface of an imaged object onto which the light spots are projected on a basis of the projection angles thus determined;
the pattern light projected from the projection device includes a plurality of cells, each in an on state or an off state, forming an identification code accompanying each light spot;
the distance information generation device determines the positions of the light spots accompanied by the identification codes in the projected pattern on a basis of the identification codes;
the identification code accompanying each light spot has a first part comprising a plurality of cells, aligned in a first direction in the projected pattern, and disposed on one side of the light spot in a second direction in the projected pattern, and a second part comprising a plurality of cells, aligned in the second direction, and disposed on one side of the light spot in the first direction;
the identification codes accompanying the light spots that are adjacent in the first direction have at most one location at which the cells constituting the second parts of the identification codes change from the on state to the off state or from the off state to the on state; and
the first parts of the identification codes accompanying the light spots that are adjacent in the second direction are mutually identical;
wherein the imaging device has an optical filter having transmission characteristics in a visible wavelength band and a wavelength of the pattern light, with transmittance in the visible wavelength band being lower than at the wavelength of the pattern light;
the separation device separates the projected image component from the imaging signal obtained by imaging by the imaging device by taking a difference between the imaging signal obtained when the pattern light is projected and the imaging signal obtained when the pattern light is not projected; and
the transmission characteristics of the optical filter are determined such that the difference has a value equal to or greater than a prescribed number of gradation levels of the imaging signal.

2. The image generation device of claim 1, wherein the distance information generation device has:

an identification code reading device that reads the identification codes accompanying the light spots included in the projected image component obtained by the separation device;

a validation device to determine whether or not a condition that there is at most one location where the second part of an identification code accompanying each light spot read by the identification code reading device changes with respect to the second part of the identification code accompanying a light spot adjacent to said each light spot in the first direction, and that the first part of the identification code accompanying each light spot read by the identification code reading device is identical to the first part of the identification code accompanying a light spot adjacent to said each light spot in the second direction, is satisfied or not, and thereby determining whether the identification code that is read is valid or not; and a projection angle estimation device to estimate the projection angles of the light spots on a basis of the identification codes determined to be valid by the validation device.

3. The image generation device of claim 1, wherein the identification codes are determined such that an arrangement of cells in the on state and the off state constituting the identification codes accompanying all of the light spots included in the projected pattern is point symmetric with respect to the center of the projected pattern.

4. The image generation device of claim 3, wherein:
the distance information generation device calculates a range of distances to the imaged object on which the light spot is projected from a ratio between a size of a spot area in the projected image that has been imaged and a size of a dot positioned in the cell in the spot area; and when the distance to the imaged object calculated on the basis of the projection angle is not within the range of distances determined on a basis of the ratio between the size of the spot area and the size of the dot, the distance information generation device treats as invalid the distance calculated on the basis of the projection angle.

5. The image generation device of claim 1, wherein the separation device separates, from the imaging signal obtained by imaging by the imaging device, the imaging signal obtained when the pattern light is not projected, as a background component,
said image generation device further comprising a background image generation device that generates a background image from the background component separated by the separation device.

6. The image generation device of claim 5, wherein the background image generation device has a pixel summation device that amplifies the imaging signal by adding pixel values of surrounding pixels.

7. The image generation device of claim 6, wherein the pixel summation device adds, to each pixel, the pixel values of surrounding pixels in positions in a same frame.

8. The image generation device of claim 6, wherein the pixel summation device adds, to each pixel, pixel values of each pixel in the same position as each pixel in frames positioned preceding and following a frame including the pixel.

9. The image generation device of claim 6, wherein the transmittance of the optical filter in the visible wavelength band is equal to a reciprocal of the number of pixels summed by the pixel summation device.

10. An image generation device comprising:
a projection device for projecting pattern light of a prescribed wavelength into an imaged space creating a projected pattern;
an imaging device for imaging the imaged space;
a separation device for separating a projected image component from an imaging signal obtained by imaging by the imaging device by taking a difference between the imaging signal obtained when the pattern light is projected and the imaging signal obtained when the pattern light is not projected; and
a distance information generation device for generating distance information on a basis of a projected image component separated by the separation device; wherein
the distance information generation device determines projection angles of light spots in the projected pattern from an arrangement of the light spots in a projected image represented by the projected image component and a prestored relationship between the projection angles and positions of the light spots in the projected pattern, and determines a distance to a surface of an imaged object onto which the light spots are projected on a basis of the projection angles thus determined;
the pattern light projected from the projection device includes a plurality of cells, each in an on state or an off state, forming an identification code accompanying each light spot;
the distance information generation device determines the positions of the light spots accompanied by the identification codes in the projected pattern on a basis of the identification codes; and
the identification codes are determined in such a manner that there is only one location at which the cells constituting the identification codes change from the on state to the off state or from the off state to the on state between the light spots that are adjacent in a first direction in the projected pattern;
wherein the imaging device has an optical filter having transmission characteristics in a visible wavelength band and a wavelength of the pattern light, with transmittance in the visible wavelength band being lower than at the wavelength of the pattern light;
the separation device separates the projected image component from the imaging signal obtained by imaging by the imaging device by taking a difference between the imaging signal obtained when the pattern light is projected and the imaging signal obtained when the pattern light is not projected; and
the transmission characteristics of the optical filter are determined such that the difference has a value equal to or greater than a prescribed number of gradation levels of the imaging signal.

11. The image generation device of claim 10, wherein the identification code accompanying each light spot has a first part comprising a plurality of cells, aligned in a first direction in the projected pattern, and disposed on one side of the light spot in a second direction in the projected pattern, and a second part comprising a plurality of cells, aligned in the second direction, and disposed on one side of the light spot in the first direction.

12. The image generation device of claim 11, wherein the distance information generation device has
an identification code reading device for reading the identification codes accompanying the light spots included in the projected image component obtained by the separation device;

a validation device for determining whether or not a condition that there is at most one location where the identification code accompanying each light spot read by the identification code reading device changes with respect to the identification code accompanying a light spot adjacent in the first direction, and thereby determining whether the read identification code is valid or not; and a projection angle estimation device that estimates the projection angles of the light spots on a basis of the identification codes determined to be valid by the validation device.

13. The image generation device of claim 10, wherein the identification codes are determined such that an arrangement of cells in the on state and the off state constituting the identification codes accompanying all of the light spots included in the projected pattern is point symmetric with respect to the center of the projected pattern.

14. The image generation device of claim 13, wherein:

the distance information generation device calculates a range of distances to the imaged object on which the light spot is projected from a ratio between a size of a spot area in the projected image that has been imaged and a size of a dot positioned in the cell in the spot area; and when the distance to the imaged object calculated on the basis of the projection angle is not within the range of distances determined on a basis of the ratio between the size of the spot area and the size of the dot, the distance information generation device treats as invalid the distance calculated on the basis of the projection angle.

15. The image generation device of claim 10, wherein the separation device separates, from the imaging signal obtained by imaging by the imaging device, the imaging signal obtained when the pattern light is not projected, as the background component, said image generation device further comprising a background image generation device that generates a background image from a background component separated by the separation device.

16. The image generation device of claim 15, wherein the background image generation device has a pixel summation device that amplifies the imaging signal by adding pixel values of surrounding pixels.

17. The image generation device of claim 16, wherein the pixel summation device adds, to each pixel, the pixel values of surrounding pixels in positions in a same frame.

18. The image generation device of claim 16, wherein the pixel summation device adds, to each pixel, pixel values of each pixel in the same position as each pixel in frames positioned preceding and following a frame including the pixel.

19. The image generation device of claim 16, wherein the transmittance of the optical filter in the visible wavelength band is equal to a reciprocal of the number of pixels summed by the pixel summation device.

* * * * *